(12) United States Patent
Sayres et al.

(10) Patent No.: US 9,618,720 B2
(45) Date of Patent: Apr. 11, 2017

(54) FLEXIBLE EXTRUDED CABLE MOLDING SYSTEM, METHODS, AND TOOLS

(71) Applicant: ADC Telecommunications, Inc., Berwyn, PA (US)

(72) Inventors: Derek Sayres, Lonsdale, MN (US); Thomas Marcouiller, Shakopee, MN (US); Thomas G. LeBlanc, Westminster, MA (US); Wayne M. Kachmar, North Bennington, VT (US); Ronald J. Kleckowski, Manchester Center, VT (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/057,634

(22) Filed: Oct. 18, 2013

(65) Prior Publication Data

US 2014/0153890 A1    Jun. 5, 2014

Related U.S. Application Data

(63) Continuation of application No. 12/472,905, filed on May 27, 2009, now abandoned.

(Continued)

(51) Int. Cl.
*E04B 2/00* (2006.01)
*B29C 65/00* (2006.01)
(Continued)

(52) U.S. Cl.
CPC ............ *G02B 6/50* (2013.01); *B29C 47/003* (2013.01); *B29C 47/0023* (2013.01);
(Continued)

(58) Field of Classification Search
CPC ...... G02B 6/44; G02B 6/4446; G02B 6/3825; G02B 6/4457; G02B 6/50; G02B 6/4453;
(Continued)

(56) References Cited

U.S. PATENT DOCUMENTS 423,449 A    3/1890  Seely
1,352,739 A  9/1920  Egerton
(Continued)

FOREIGN PATENT DOCUMENTS

EP    0 683 032 A2   11/1995
JP    10-275989      10/1998
(Continued)

OTHER PUBLICATIONS

ADC Telecommunications, Inc., "Description of Admitted Prior Art", filed Oct. 27, 2009 in U.S. Appl. No. 12/182,705.*

(Continued)

*Primary Examiner* — Alex Efta
(74) *Attorney, Agent, or Firm* — Merchant & Gould P.C.

(57) ABSTRACT

A molding system includes a flexible cable carrier body that defines a sealing opening that provides access to an interior channel. A continuous length of the flexible cable carrier body is wrapped about a spool for storage and for ease of dispensing at a work site. The continuous length of the cable carrier body is cut to desired custom lengths during installation at the work site. An insertion tool having a plow and feeder channel can facilitate payoff of the fiber/cable into the cable carrier body.

18 Claims, 28 Drawing Sheets

Related U.S. Application Data

(60) Provisional application No. 61/128,960, filed on May 27, 2008, provisional application No. 61/056,478, filed on May 28, 2008, provisional application No. 61/142,811, filed on Jan. 6, 2009.

(51) Int. Cl.

| | | |
|---|---|---|
| *G02B 6/50* | (2006.01) | |
| *B65H 75/40* | (2006.01) | |
| *B65H 75/14* | (2006.01) | |
| *H02G 1/06* | (2006.01) | |
| *H02G 11/02* | (2006.01) | |
| *B65H 75/38* | (2006.01) | |
| *B29C 47/00* | (2006.01) | |
| *H02G 3/04* | (2006.01) | |
| *G02B 6/44* | (2006.01) | |
| *G02B 6/46* | (2006.01) | |
| *B65H 75/22* | (2006.01) | |
| *H02G 3/34* | (2006.01) | |
| *H02G 3/32* | (2006.01) | |
| *B29C 47/34* | (2006.01) | |

(52) U.S. Cl.
CPC ............. *B65H 75/14* (2013.01); *B65H 75/38* (2013.01); *B65H 75/40* (2013.01); *G02B 6/4446* (2013.01); *G02B 6/4459* (2013.01); *G02B 6/46* (2013.01); *H02G 1/06* (2013.01); *H02G 3/0481* (2013.01); *H02G 11/02* (2013.01); *B29C 47/34* (2013.01); *B29C 2793/0018* (2013.01); *B65H 75/22* (2013.01); *H02G 3/32* (2013.01); *H02G 3/34* (2013.01); *Y10T 156/1002* (2015.01); *Y10T 156/1062* (2015.01)

(58) Field of Classification Search
CPC ........ G02B 6/4459; H02G 11/02; H02G 3/32; H02G 3/34; H02G 1/06; B65H 75/22; B65H 75/14; B65H 75/38; B65H 75/40; B29C 47/003; B29C 47/34; B29C 2793/0018
See application file for complete search history.

(56) References Cited

U.S. PATENT DOCUMENTS

| | | | |
|---|---|---|---|
| 2,299,356 A | | 10/1942 | Strohm et al. |
| 3,029,303 A | | 4/1962 | Severino |
| 4,067,258 A | | 1/1978 | Valeri |
| 4,530,865 A | | 7/1985 | Sprenger |
| 4,534,147 A | | 8/1985 | Cristell |
| 4,635,886 A | | 1/1987 | Santucci et al. |
| 4,903,913 A | * | 2/1990 | McCaffrey ............ B65H 75/22 242/118.6 |
| 5,306,868 A | | 4/1994 | Faust et al. |
| 5,339,058 A | | 8/1994 | Lique |
| 5,661,263 A | | 8/1997 | Salvaggio |
| 5,708,751 A | * | 1/1998 | Mattei .................. G02B 6/4453 385/134 |
| 5,717,810 A | * | 2/1998 | Wheeler .............. G02B 6/4452 385/134 |
| 5,884,901 A | | 3/1999 | Schilling |
| 6,145,780 A | | 11/2000 | Fontana |
| D437,832 S | | 2/2001 | Henry |
| 6,220,413 B1 | | 4/2001 | Walters et al. |
| 6,498,297 B2 | | 12/2002 | Samhammer |
| 6,521,835 B1 | | 2/2003 | Walsh |
| 7,098,405 B2 | | 8/2006 | Glew |
| 7,225,534 B2 | | 6/2007 | Kachmar |
| 7,309,836 B2 | | 12/2007 | Lubanski |
| 7,332,672 B2 | | 2/2008 | Henry |
| 7,397,993 B1 | | 7/2008 | Navé et al. |
| 7,400,814 B1 | * | 7/2008 | Hendrickson ........ G02B 6/4441 385/134 |
| 2006/0049294 A1 | * | 3/2006 | Thebault .............. G02B 6/4457 242/388.1 |
| 2006/0153362 A1 | * | 7/2006 | Bloodworth et al. ... 379/413.02 |
| 2006/0210230 A1 | | 9/2006 | Kline et al. |
| 2007/0036506 A1 | | 2/2007 | Kewitsch |
| 2007/0251167 A1 | | 11/2007 | Kaplan |
| 2008/0152294 A1 | * | 6/2008 | Hirano ................. G02B 6/4457 385/135 |
| 2008/0285933 A1 | * | 11/2008 | Vogel ................... G02B 6/4452 385/135 |
| 2009/0074370 A1 | * | 3/2009 | Kowalczyk .......... G02B 6/4441 385/135 |
| 2009/0324188 A1 | | 12/2009 | Berglund et al. |

FOREIGN PATENT DOCUMENTS

| | | |
|---|---|---|
| JP | 2007-306743 | 11/2007 |
| WO | WO 2005/071284 A1 | 8/2005 |

OTHER PUBLICATIONS

European Search Report for Application No. 14183323.6 mailed Oct. 8, 2014.
European Search Report for 09767303.2 mailed Feb. 10, 2014.
International Search Report and Written Opinion mailed Jan. 6, 2010.
Multilink, FTTX Commercial, Business, and Residential Product Solutions Catalog 2007, Section 4, Pathway Products, pp. 95-107.
Panduit, *Office Furniture Raceway System*, ©2005 (12 pages).
Tyco Electronics, *AMP Netconnect: Surface Raceway System*, May 2007 (14 pages).

\* cited by examiner

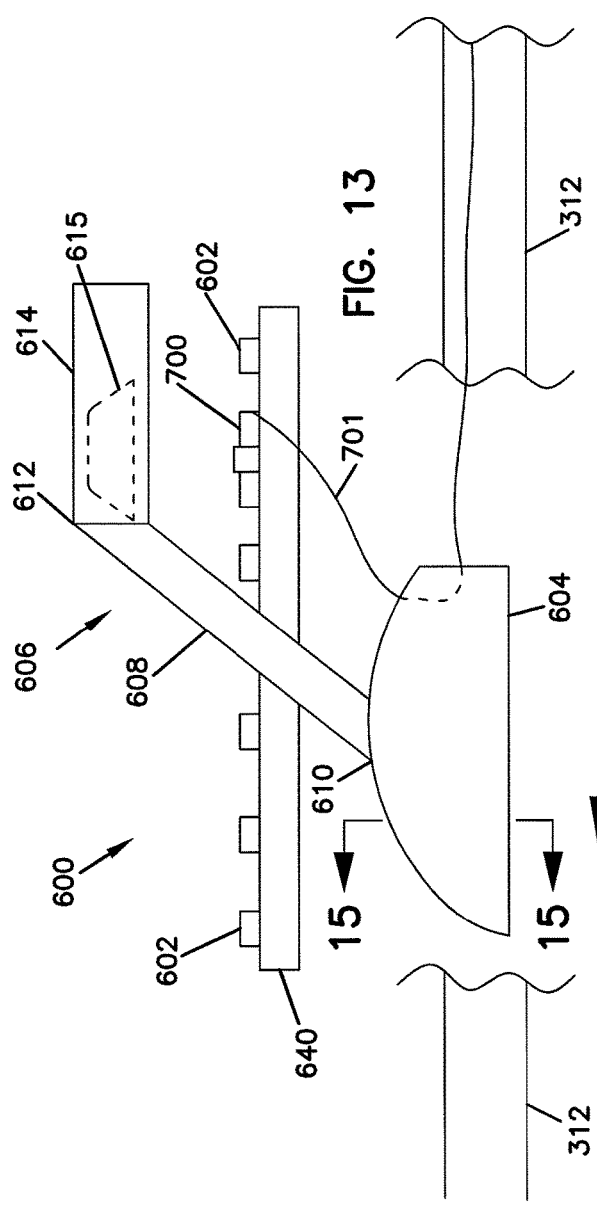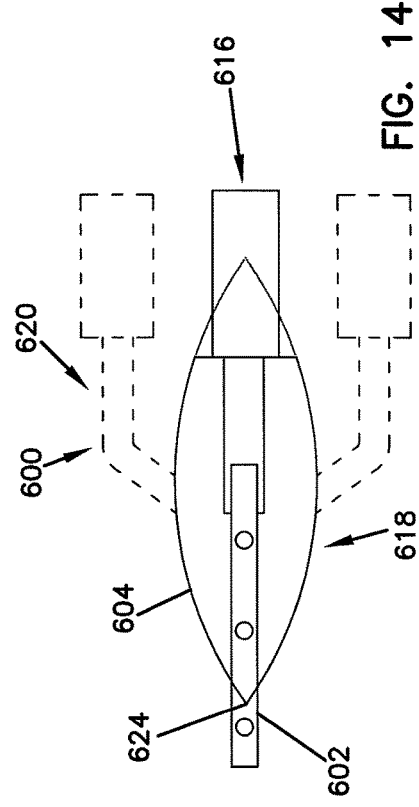

FLEXIBLE EXTRUDED CABLE MOLDING SYSTEM, METHODS, AND TOOLS

CROSS REFERENCE TO RELATED APPLICATIONS

This application is a continuation of application Ser. No. 12/472,905, filed on May 27, 2009, now abandoned, which application claims the benefit of provisional application Ser. No. 61/128,960, filed on May 27, 2008, provisional application Ser. No. 61/056,478, filed on May 28, 2008, and provisional application Ser. No. 61/142,811, filed on Jan. 6, 2009, which applications are incorporated herein by reference in their entirety.

TECHNICAL FIELD

The present disclosure relates generally to devices for use in the telecommunications industry, and various methods associated with such devices. More particularly, this disclosure relates to a cable molding system, and various methods associated with cable molding systems.

BACKGROUND

Molding systems are used to hold, protect, and in some cases conceal cabling. Cabling is sometimes run or is installed in corners of walls, ceilings, and/or floors of new or existing structures. Conventional molding systems used to contain such cabling are rigid and provided in short straight sections. The short straight sections are typically made of metal or plastic and joined or mated together in areas having long cabling runs. Accessory components are required to join section ends of long cabling runs. Joining section ends of such conventional molding systems adds time and expense to installation procedures, and can further cause long cabling runs to look clutter and unappealing. As can be understood, the rigid short sections of such conventional systems also do not conform well to anything other than straight surfaces. Improvement of molding systems is desired.

SUMMARY

The present disclosure relates to a molding system that contains cabling, such as fiber optic cabling. The molding system includes a flexible cable carrier body. In one aspect, the flexible cable carrier body has a sealing opening that provides access to and encloses an interior cable-carrying channel. In another aspect, the flexible cable carrier is manufacture in a continuous length that is wrapped about a spool for storage. In another aspect, the continuous length of flexible cable carrier body is dispensed from the spool at a work site; the dispensed cable carrier body being cut to a desired custom length.

A variety of examples of desirable product features or methods are set forth in part in the description that follows, and in part will be apparent from the description, or may be learned by practicing various aspects of the disclosure. The aspects of the disclosure may relate to individual features as well as combinations of features, including combinations of features disclosed in separate embodiments. It is to be understood that both the foregoing general description and the following detailed description are explanatory only, and are not restrictive of the claimed invention.

BRIEF DESCRIPTION OF THE DRAWINGS

FIGS. 13-16 show a fiber optic cable insertion tool usable with the system of FIG. 12 in accordance with the principles of the present disclosure;

DETAILED DESCRIPTION

Reference will now be made in detail to example aspects of the present disclosure that are illustrated in the accompanying drawings. Wherever possible, the same reference numbers will be used throughout the drawings to refer to the same or like parts.

Figure 1:
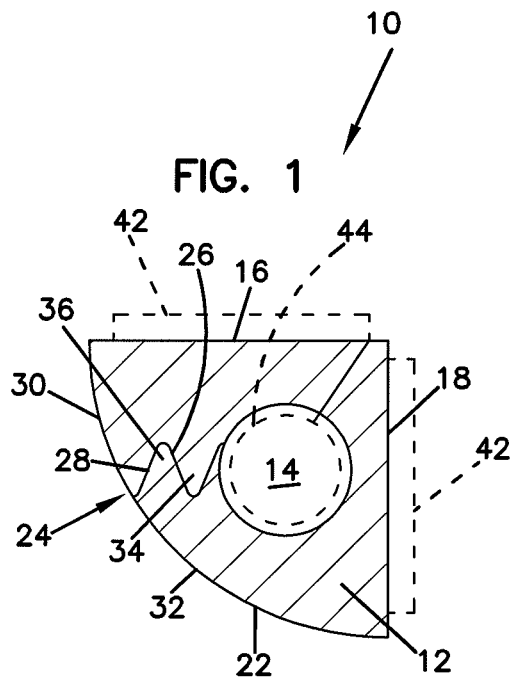
FIG. 1 is a cross-sectional view of one embodiment of a molding system, in accordance with the principles disclosed.

FIG. 1 illustrates one embodiment of a cable molding system 10 in accordance with the principles disclosed. The molding system 10 includes a flexible, extruded molding or cable carrier body 12 that can mount in the corner of two walls or surfaces, and that can mount to a flat surface of a wall, floor, or ceiling. The molding system 10 is designed for use in routing optical fibers and/or fiber optic cables within the interior of a building. The molding system is also designed for use in routing fibers and/or cables at the exterior of a building.

The extruded cable carrier body 12 of the depicted cable molding system 10 defines a fully enclosed cavity or interior channel 14 for containing cabling, such as fiber cabling, for example. What is meant by "fully enclosed" is that the cavity or interior channel is entirely enclosed such that no gap exists around a perimeter or circumference of a cross-section of the interior channel 14. The enclosed interior channel 14 protects cabling placed within the channel from environmental damage. In other embodiments, the interior channel may be partially enclosed.

The cable carrier body 12 of the cable molding system of FIG. 1 has a quarter-round cross-sectional shape. The quarter-round cross-sectional shape includes a first exterior mounting surface 16 and a second exterior mounting surface 18. The exterior mounting surfaces 16, 18 are generally planar exterior mounting surfaces. A non-mounting surface 22 defined by an exterior, convexly curved surface extends between the first and second exterior mounting surfaces 16, 18 to close the cable carrier body 12.

The cable carrier body 12 of the cable molding system 10 defines an opening 24 that provides access to the enclosed interior channel 14. In the illustrated embodiment, the opening 24 is located in the non-mounting surface 22 of the cable carrier body 12. Preferably, the opening 24 is a sealing opening that not only provides access to the interior channel, but also seals and encloses the interior channel 14 after placement of one or more cables 44 (one cable shown in dashed line in FIG. 1) within the interior channel. In the illustrated embodiment, the sealing opening 24 includes a labyrinth structure 26. The labyrinth structure 26 is defined by a non-linear cut 28 in the cable carrier body 12. The non-linear cut 28 extends from the exterior (e.g., exterior surface 22) of cable carrier body to the interior channel 14.

The sealing opening 24 of the present molding system defines first and second closing portions 30, 32 of the cable carrier body 12. The first and second closing portions 30, 32 can be flexed open to allow placement of cabling within the interior channel 14 of the cable carrier body 12.

A first protrusion 34 defined by the non-linear cut 28 is formed by the first closing portion 30 of the cable carrier body 12, and a second protrusion 36 defined by the non-linear cut is formed by the second closing portion 32 of the cable carrier body. The first protrusion 34 and the second protrusion 36 are aligned between the interior channel 14 and the exterior of the cable carrier body to create the labyrinth structure 26 that seals and encloses the interior channel 14.

The extruded cable carrier body 12 is made of a flexible material. As will be described in greater detail hereinafter, the flexible construction of the cable molding system permits a continuous length of the cable carrier body 12 to be wrapped around a spool for storage prior to installation, and for payoff or dispersal at installation.

Figure 2:
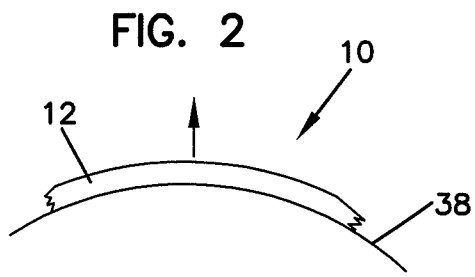
FIG. 2 is a schematic representation of one mounting configuration of the molding system of FIG. 1 in accordance with the principles of the present disclosure.
Figure 3:
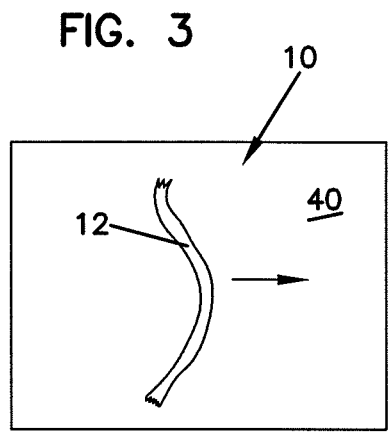
FIG. 3 is a schematic representation of another mounting configuration of the molding system of FIG. 1 in accordance with the principles of the present disclosure.

The flexible construction of the present cable molding system 10 further permits an installer to mount the cable carrier body 12 in a number of bending or curving configurations, includes at least first and second curving configurations. In the first curving configuration, shown in FIG. 2, one of the exterior mounting surfaces 16, 18 of the cable carrier body 12 is mounted to a curved surface 38. In this first configuration, the extruded cable carrier body 12 bends with the curved surface 38 in a first direction along a non-linear pathway. In the second curving configuration, shown in FIG. 3, one of the exterior mounting surfaces of the cable carrier body is mounted to a planar surface 40 such that only the cable carrier body 12 bends or curves along the planar surface. In this second configuration, the extruded cable carrier body 12 bends in a second direction of a non-linear pathway along the planar surface, the second direction being transverse to the first direction. In yet another configuration, the cable carrier body 12 can be mounting in a snaking or radius manner (e.g., see FIG. 3) to a curved surface (e.g., see FIG. 2) such that the cable carrier body 12 bends in both the first and second directions.

As described, the flexible construction of the present molding system 10 permits the cable carrier body 12 to bend in both the first direction and the second transverse direction. To bend in both directions, not only are the closing portions 30, 32 flexible (to allow placement of cabling within the interior channel), but also the entire body 12 of the cable molding system 10 is flexible.

Figure 4:
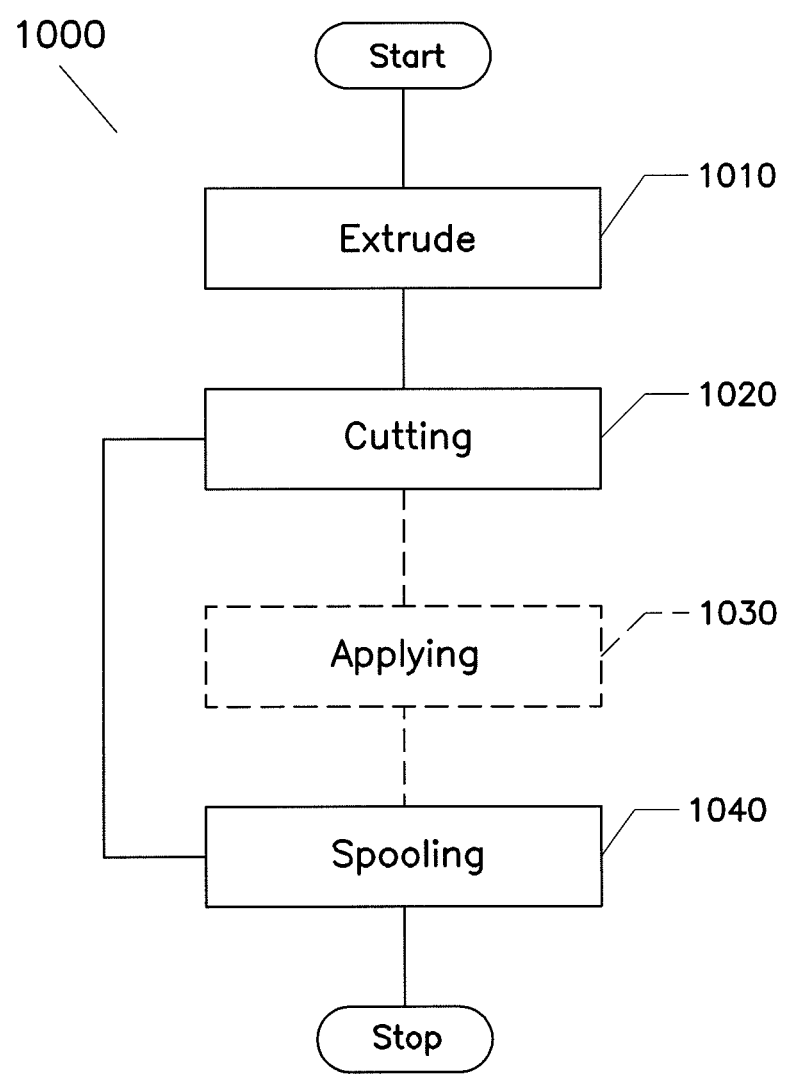
FIG. 4 is a diagrammatic representation of a method of manufacturing the molding system of FIG. 1 in accordance with the principles of the present disclosure.

FIG. 4 is a flowchart illustrating one example manufacturing process 1001. In the manufacturing process 1001, a continuous length of the cable carrier body 12 is extruded at an extruding operation 1010. As noted above, the extruded length of cable carrier body 12 defines an interior channel 14. In one embodiment, the extruding operation 1010 forms a carrier body with a semi-circular transverse cross-section.

In another embodiment, the extruding operation 1010 forms a carrier body with a quarter-round transverse cross-section. In another embodiment, the extruding operation 1010 forms a carrier body with a square transverse cross-section.

A cutting operation 1020 provides an opening 24 in the cable carrier body 12 extending between an exterior of the cable carrier body and an interior channel 14. Typically, the cutting operation 1020 provides a non-linear cut 28 in the cable carrier body 12. The cutting operation 1020 creates the first and second closing portions 30, 32 of the cable carrier body 12, as well as the first and second protrusions 34, 36 of the labyrinth structure 26. In an optional applying operation 1030, an adhesive material or backing 42 (shown in dashed lines in FIG. 1) can be applied to one or more of the exterior mounting surfaces (e.g., surfaces 16, 18) of the cable carrier body 12.

After cutting the opening 24 at the cutting operation 1020 and optionally applying the adhesive backing 42 at applying operation 1030, a spooling operation 1040 wraps the continuous length of the extruded cable carrier body 12 around a spool for storage. In one embodiment, the spooling operation 1040 wraps and stores a continuous length of about 500 feet on the spool. As can be understood greater or lesser continuous lengths can be provided on the spool for particular storage or work-project applications.

Figure 5:
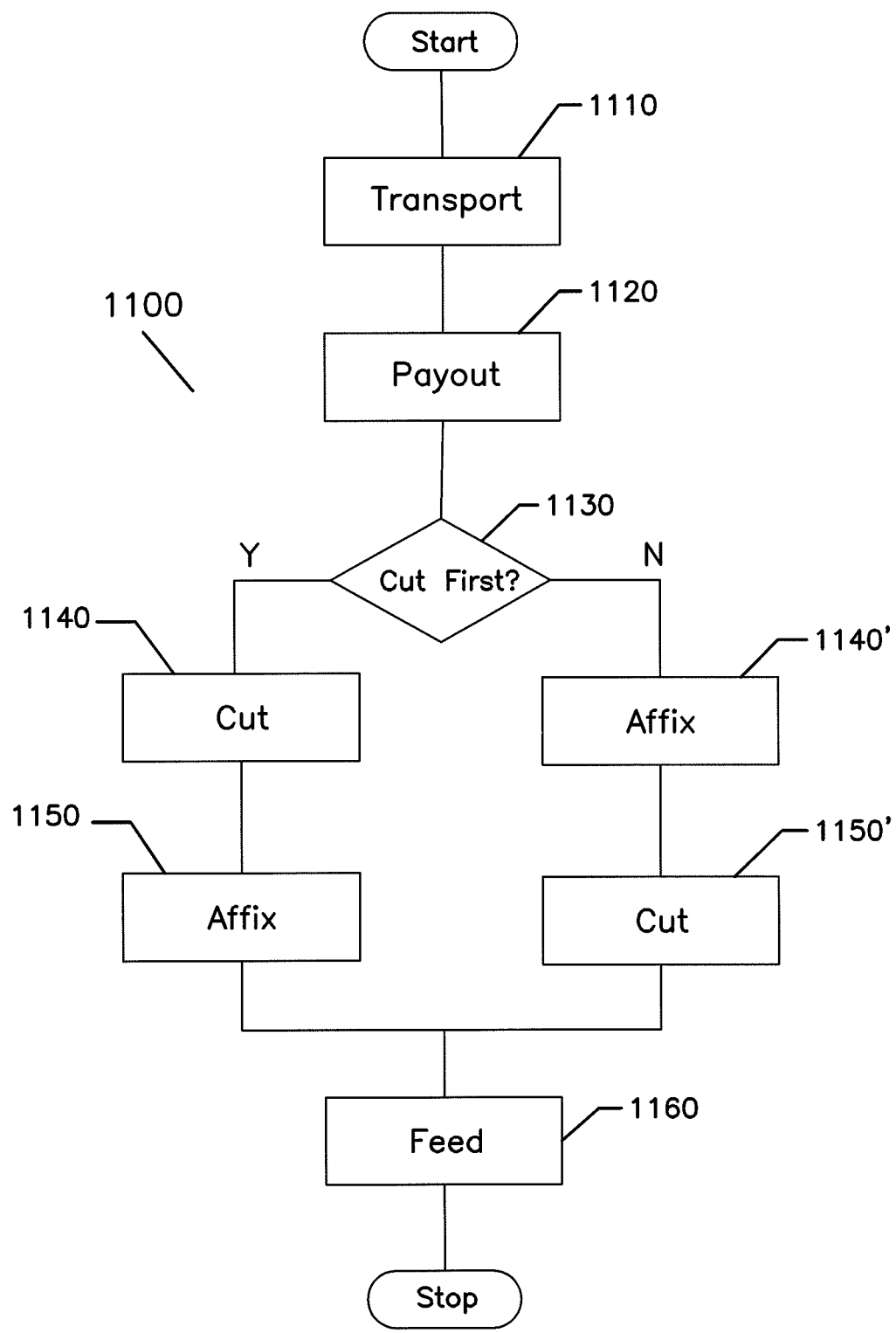
FIG. 5 is a diagrammatic representation of a method of installing the molding system of FIG. 1 in accordance with the principles of the present disclosure.

In some embodiments, an installer can pre-measure the required custom lengths of molding to be installed at a remote work site for a particular application. The installer can pre-cut the cable carrier body 12 to the required custom lengths for installation at the remote work site. Alternatively, and referring to FIG. 5, the cable carrier body 12 can be cut onsite in one example installation process 1100.

In installation process 1100, the installer can transport the spool with the uncut carrier body 12 to the work site at a transport operation 1110. In some embodiments, the installer can transport multiple spools of the extruded carrier body 12 to the work site. At the work site, an installer may dispense a portion of the continuous length of the extruded cable carrier from the spool in a payout operation 1120. In one example embodiment, the installer payouts a portion of the carrier body 12 along and/or adjacent to a surface to which the carrier is to be secured.

The installer decides (at determination module 1130) whether to cut the extruded molding first or whether to secure the extruded molding first. In the case of the former, the installer cuts the cable carrier body 12 to an appropriate length at a cut operation 1140 prior to securing the cut body to an existing surface at an affix operation 1150. In the case of the latter, the installer first secures the cable carrier body 12 to an existing surface at an affix operation 1140' prior to cutting the cable carrier body 12 to an appropriate length at a cut operation 1150'.

At the end of the installation process 1100, the installer then feeds cabling (e.g., one or more optical fibers) into the interior channel 14 of the carrier body 12.

In one method of use, the adhesive backing 42 secures the molding system 10 to the existing surface. As previously described, the adhesive backing 42 can be applied to the cable carrier body 12 prior to storage on the spool. The adhesive backing 42 also can be applied instead to the existing surface, and the cable carrier body secured to the surface-applied adhesive backing. As can be understood, the adhesive backing 42 can include material suitable for adhesion to an exterior surface of a building or an interior surface of a building.

Further, in some applications, only a selected single exterior mounting surface (e.g., surface 16) is adhered to the existing surface. In such an application, the adhesive backing 42 is applied to the pre-determined mounting surface 16 of the cable carrier body 12 prior to spooling, or is applied at the work site, either to the building surface or to the mounting surface 16 of the cable carrier body 12. In other applications, more than one selected exterior mounting surface (e.g., both surfaces 16 and 18) of the carrier body is adhered to existing building surfaces.

In addition and as previously described, the cable carrier body 12 can be installed or secured to the existing building surface or surfaces along a non-linear pathway, such as described above with regards to the first and second curving configurations.

When the cable carrier body 12 is secured, the installer inserts cabling into the interior channel 14 of the cable carrier body. Insertion can be assisted by use of a plow tool that opens the opening 24 of the cable carrier body. In some embodiments, after insertion, the opening 24 of the cable carrier body 12 recovers to enclose the cabling within the interior channel 14. What is meant by "recovers" is that the closing portions 30, 32 of the cable carrier body return to a closed, sealed position without assistance from the installer. That is, the installer does not need to close a flap or cover, and does not need to snap-fit or press-closed any structure of the carrier body. The carrier body instead recovers without assistance to close automatically and to enclose the interior channel. In other embodiments, cable carrier bodies can be provided with catches or latches that allow the opened portion to be manually closed and then retained in the closed position.

In some applications, two or more ends of lengths of cable carrier bodies can be joined along straight pathways, non-linear pathways, and angled pathways by way of a joining device. Because of the ability to dispense custom lengths of the cable carrier body from the spooled continuous length, less joining is required. This provides a molding system having a cleaner look that can be installed in less time than conventional systems with short sections that require more joined unions.

Figure 6:
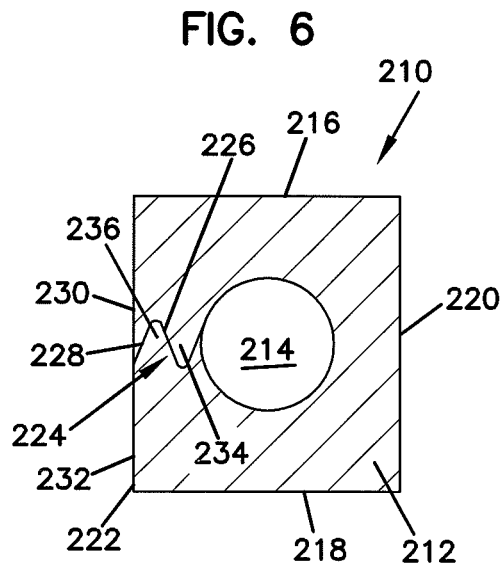
FIG. 6 is a cross-sectional view of another embodiment of a molding system, in accordance with the principles disclosed in accordance with the principles of the present disclosure.

Referring now to FIG. 6, another embodiment of a cable molding system 210 is illustrated. Similar to the previous system embodiment, the molding system 210 includes a flexible, extruded molding or cable carrier body 212 that can mount in the corner of two walls or surfaces, and that can mount to a flat surface of a wall, floor, or ceiling. The molding system 210 is also similarly designed for use in routing cables within the interior of a building or at the exterior of a building.

Like the previous embodiment, the extruded cable carrier body 212 of the cable molding system 210 defines an enclosed cavity or interior channel 214 for containing cabling, such as fiber cabling, for example. In this embodiment, the enclosed interior channel 214 is centrally located in the cable carrier body 212. The enclosed interior channel 214 protects cabling placed within the channel from environmental damage.

The cable carrier body 212 of this cable molding system has a square cross-sectional shape. The square cross-sectional shape includes a first exterior mounting surface 216, a second exterior mounting surface 218, and a third exterior mounting surface 220. The exterior mounting surfaces 216, 218, 220 are generally planar exterior mounting surfaces.

The cable carrier body 212 of the cable molding system 210 defines an opening 224 that provides access to the enclosed interior channel 214. In the illustrated embodiment, the opening 224 is located in a non-mounting surface 222 of the cable carrier body 212. Preferably, the opening 224 is a sealing opening that not only provides access to the interior channel, but also seals and encloses the interior channel 214 after placement of a cable within the interior channel. In the illustrated embodiment, the sealing opening 224 includes a labyrinth structure 226 that encloses the interior channel 214. The labyrinth structure 226 is defined by a non-linear cut 228 in the cable carrier body 212. The non-linear cut 228 extends from the exterior (e.g., exterior surface 222) of cable carrier body to the interior channel 214. As previously described, the non-linear cut 228 defines first and second closing portions 230, 232, of the cable carrier body, as well as first and second protrusions 234, 236 that create the labyrinth structure 226 to seal and enclose the interior channel 214.

Also as previously described, the extruded cable carrier body 212 is made of a flexible material for the advantages aforementioned. The methods of manufacture and the methods of installation herein described with respect to the first molding system embodiment apply to the molding system 210 of FIG. 6 as well.

Figure 7:
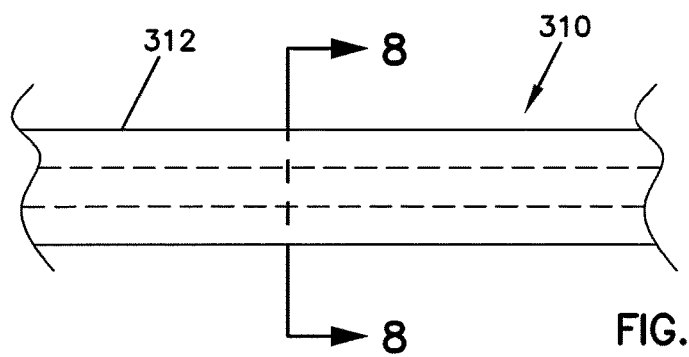
FIGS. 7, 8A, 8B, 9 and 10 show alternative fiber optic carrier bodies in accordance with the principles of the present disclosure.
Figure 8A:
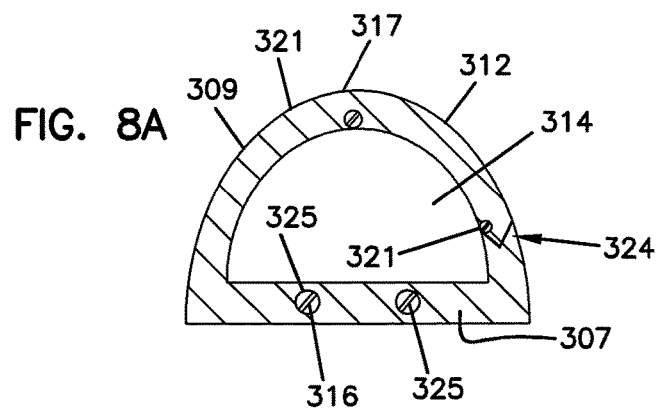

Referring now to FIGS. 7 and 8A, another embodiment of a cable molding system 310 is illustrated. The molding system 310 includes a flexible, extruded molding or cable carrier body 312 that can mount to a flat surface of a wall, floor, or ceiling. The molding system 310 is also similarly designed for use in routing cables within the interior of a building or at the exterior of a building.

The extruded cable carrier body 312 of the cable molding system 310 defines a cavity or interior channel 314 for containing cabling, such as fiber cabling, for example. In one embodiment, the channel 314 is adapted to contain a plurality of fiber optic cables each including at least one bend insensitive fiber. In certain embodiments, the fiber optic cables can have outer diameters less than 2 millimeters, or less than 1.5 millimeters, or about 1.2 millimeters. The interior channel 314 protects cabling placed within the channel from environmental damage.

The cable carrier body 312 of the cable molding system 310 has a semi-circular transverse cross-sectional shape. The cable carrier body 312 includes a base portion 307 and a cover portion 309 that projects outwardly from the base portion 307. The base portion 307 and the cover portion 309 cooperate to define the interior channel 314. The base portion 307 includes a planar exterior mounting surface 316 that extends between edges 313, 315. The cover portion 309 includes a convex exterior surface 317 having a convex curvature that extends generally from edge 313 to edge 315.

The cable carrier body 312 of the cable molding system 310 defines an access location 324 that provides access to the interior channel 314. In the illustrated embodiment, the access location 324 is defined through the cover portion 309 of the cable carrier body 312. Preferably, the access location 324 opens to provide access to the interior channel 314, and also closes (e.g., seals) to enclose the interior channel 314 after placement of a fiber optic cable within the interior channel 314.

In the illustrated embodiment, the access location 324 is a weaker region of the cover portion 309 which provides a predefined opening location that extends along the length of the carrier body 310. The predefined opening location preferably can be opened by tearing, cutting, or otherwise pulling apart the portions of the cover portion 309 located on opposite sides of the weaker region. The access location 324 can be provided by perforating, notching or otherwise weakening a predefined location of the cable carrier body 312. In certain embodiments, the cable carrier body 312 can be slit at the access location as the carrier body 312 is extruded. After extrusion, the slit region may partially reseal, but will be weaker than the remainder of the carrier body 312.

A rip cord 321 can be embedded in the cover portion 309 at the access location 324 to facilitate tearing open the access location 324. The rip cord 321 can be pulled at the factory or can be pulled in the field at the time the carrier body 310 is being used. Once the rip cord 321 has been pulled, the access location 324 can be readily opened by applying a spreading/separating force to the access location 324 to spread apart portions of the cover portion 309 (e.g., the flaps) located on opposite sides of the access location thereby forming an open slot or gap at the access location 324. It is preferred for the carrier body 312 to have a resilient construction such that the cover portion 309 is biased to resiliently return from the open position to a closed position once a fiber optic cable has been installed in the carrier body 310 and the spreading/separating force is no longer being applied at the access location 324.

Figure 8B:
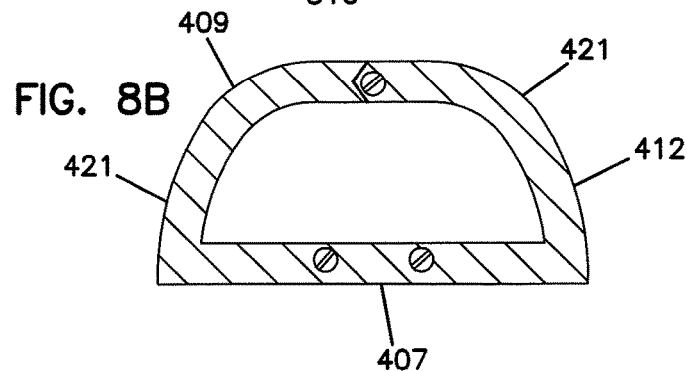

In FIG. 8A, the access location 324 is defined through the cover portion 309 in close proximity to the base 307. In this embodiment, the interior of the carrier body 312 is access by flexing open a main flap 323 that defines a majority of the cover portion 309. FIG. 8B shows a carrier body 412 having a base 407 and a cover portion 409. An access location 424 is provided at a mid-point of a cover portion 409. In this embodiment, the interior of the carrier body 412 is access by flexing apart flaps 421 located at opposite sides of the access location 424. In still other embodiments, weakened portions forming the access locations may not be provided during the extrusion process. Instead, access locations may be formed by slitting or otherwise cutting the carrier body after the extrusion process. This cutting or slitting of the main body may take place in the factory, or can be done in the field during installation of the carrier body.

Figure 9:
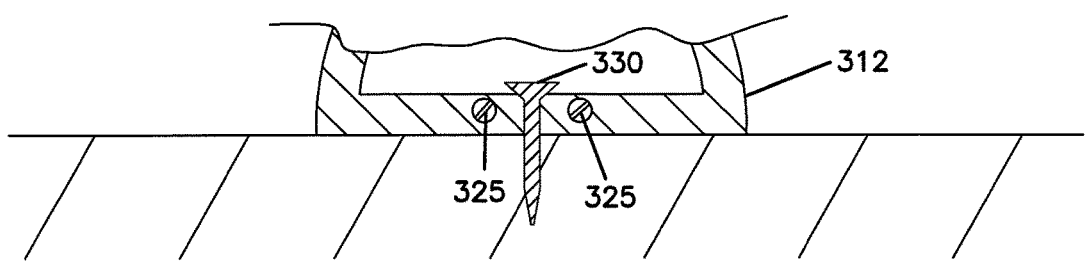
Figure 10:
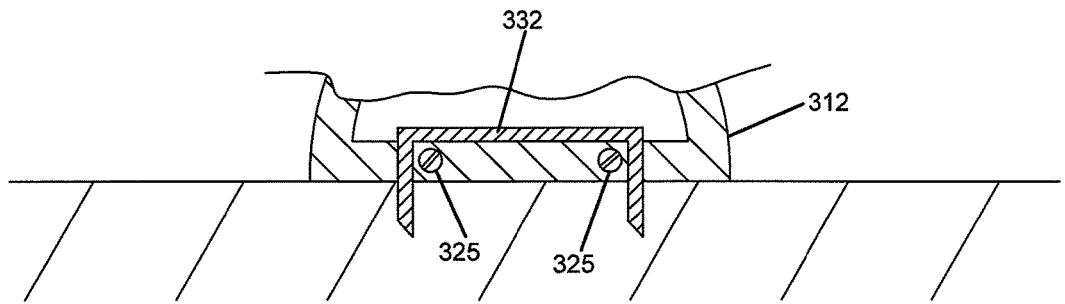

Referring to FIG. 8A, the carrier body 312 includes one or more strength members 325 embedded in the base portion 307. In the depicted embodiment, the carrier body 312 includes a pair of spaced-apart strength members 325 that extend along the length of the carrier body 312. In certain embodiments, the strength members 325 can include strands of aramid yarn, metal wires, rods formed of glass fiber reinforced epoxy or other structures adapted to reinforce the base portion 307 to resist tearing of the base portion 307 upon installation. As shown at FIGS. 9 and 10, the carrier body 312 can be secured to a structure, such as a wall, by one or more fasteners 330 (e.g., a screw or bolt), 332 (e.g., a staple) that extend through the base portion 307 at a location adjacent the strength members 325. Fastener 330 is shown extending between the strength members 325 with a head of the fastener overlapping the strength members 325. Fastener 332 is shown straddling the strength members 325.

Also as previously described, the extruded cable carrier bodies 312 and 412 are made of a flexible material for the advantages aforementioned. The methods of manufacture and the methods of installation herein described with respect to the first molding system embodiment also apply to the carrier bodies 312 and 412.

In each of the embodiments of FIGS. 1, 6, 8A and 8B, the molding system can be spooled for easy storage and payoff. The molding or cable carrier body can be unspooled or dispensed and cut to length at a job site during installation, or can be cut to pre-measured custom lengths off site. The flexibility of the present molding system not only allows continuous lengths to be efficiently stored, but also allows for routing such molding along large radii and other curved and odd shaped surfaces. The accommodation of custom lengths by the present molding system provides cabling pathways having a cleaner, less jointed appearance.

Figure 11:
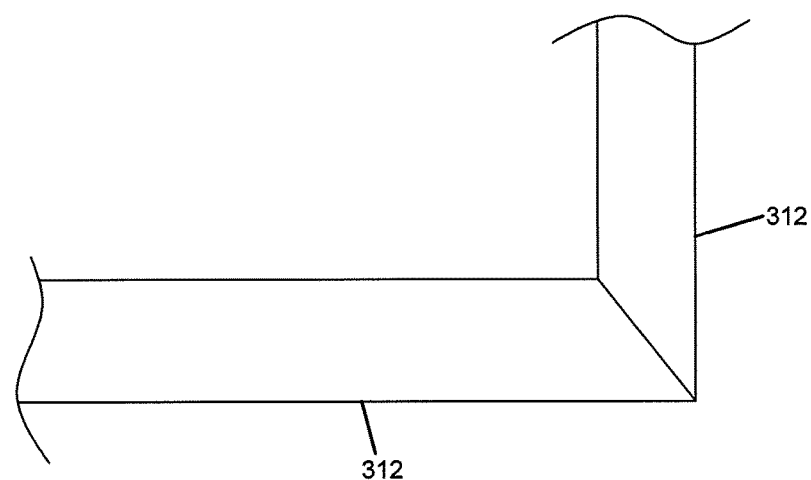
FIG. 11 shows a cutting configuration for carrier bodies in accordance with the principles of the present disclosure.
Figure 12:
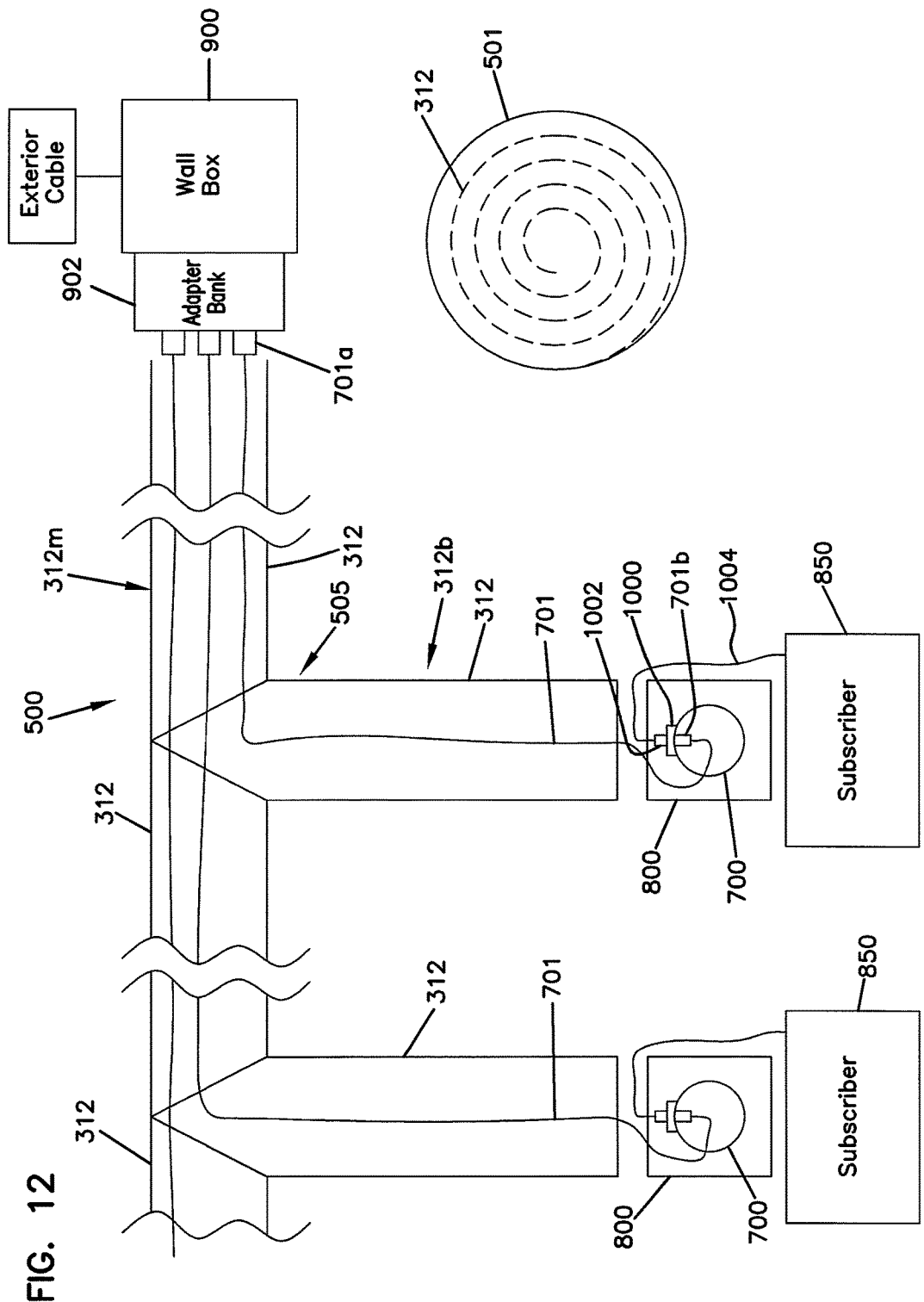
FIG. 12 shows a cable installation system in accordance with the principles of the present disclosure.

It will be appreciated that the carrier bodies can be cut at various angles (e.g., straight cuts and 45 degree angled miter cuts). For example, FIG. 11 shows two pieces of carrier body 312 cut at 45 degree miter angles so as to form a 90 degree corner section. FIG. 12 shows a plurality of carrier bodies 312 cut at 45 degree miter angles so as to define a plurality of 90 degree T branches locations.

Figures 17, 18:
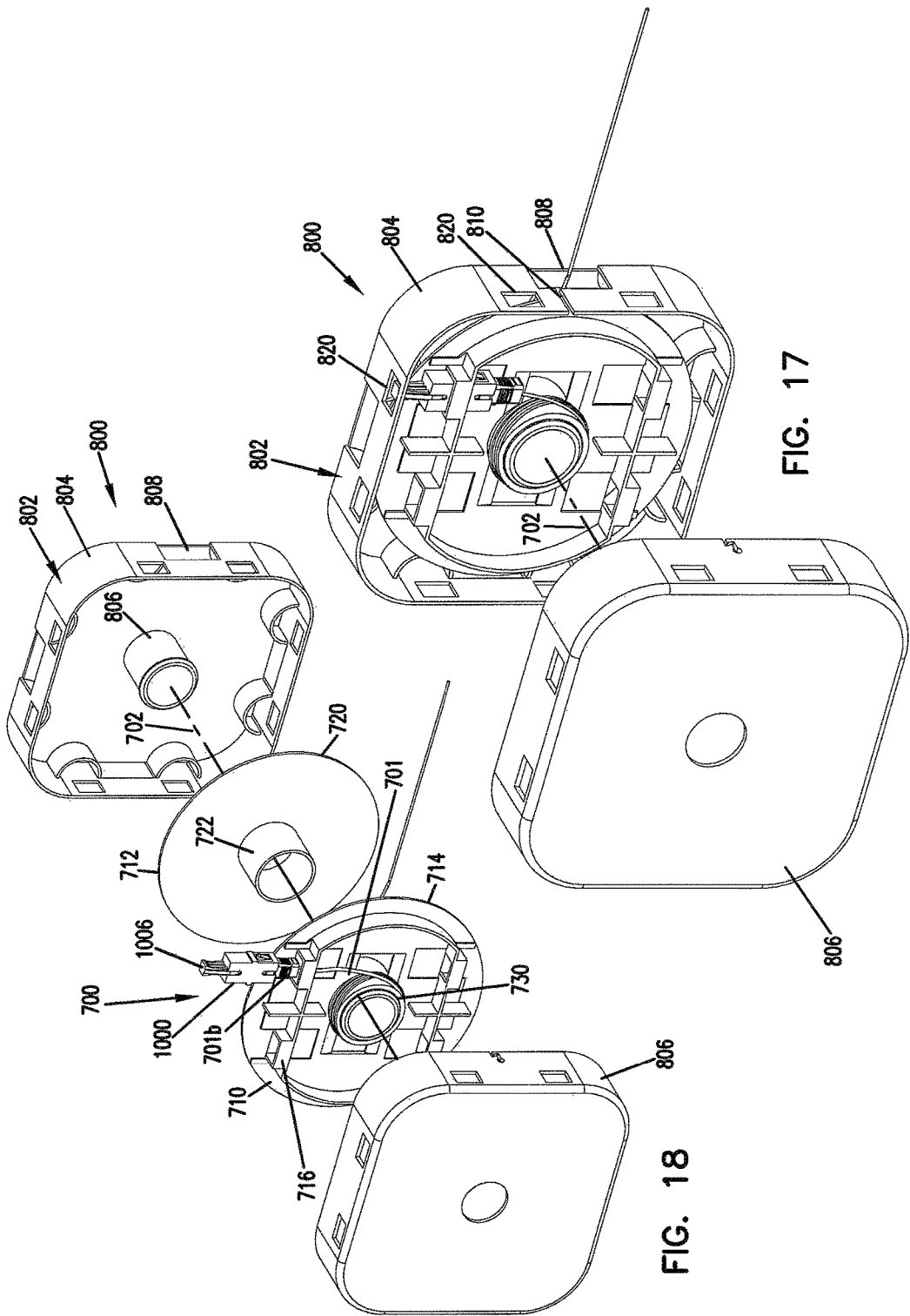
FIGS. 17 and 18 show an outlet box usable with the system of FIG. 12.
Figure 20:
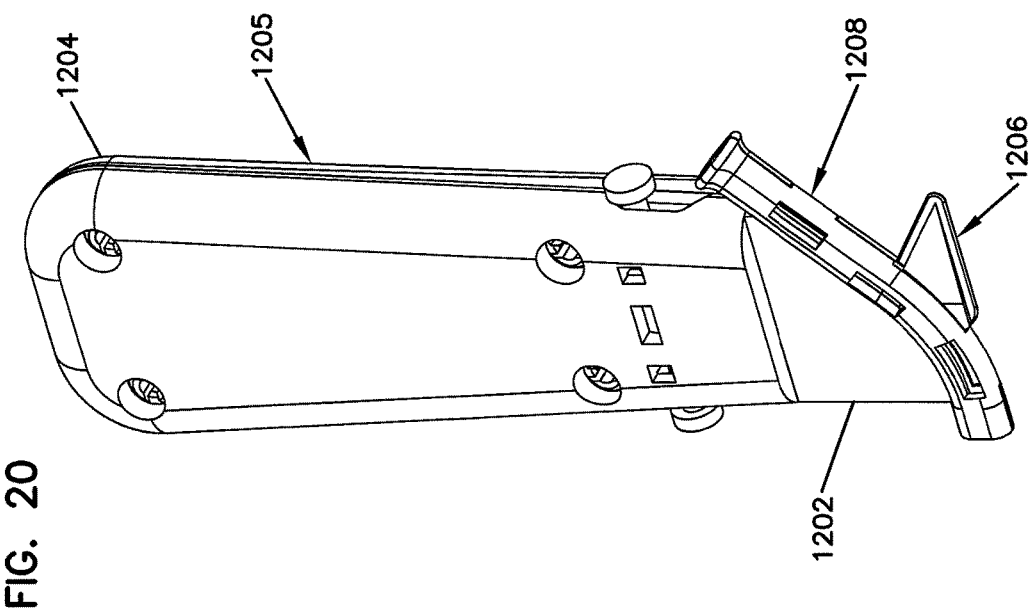
FIGS. 19 and 20 are first side perspective views of an example insertion tool for use in the cable installation systems described herein in accordance with the principles of the present disclosure.
Figure 19:
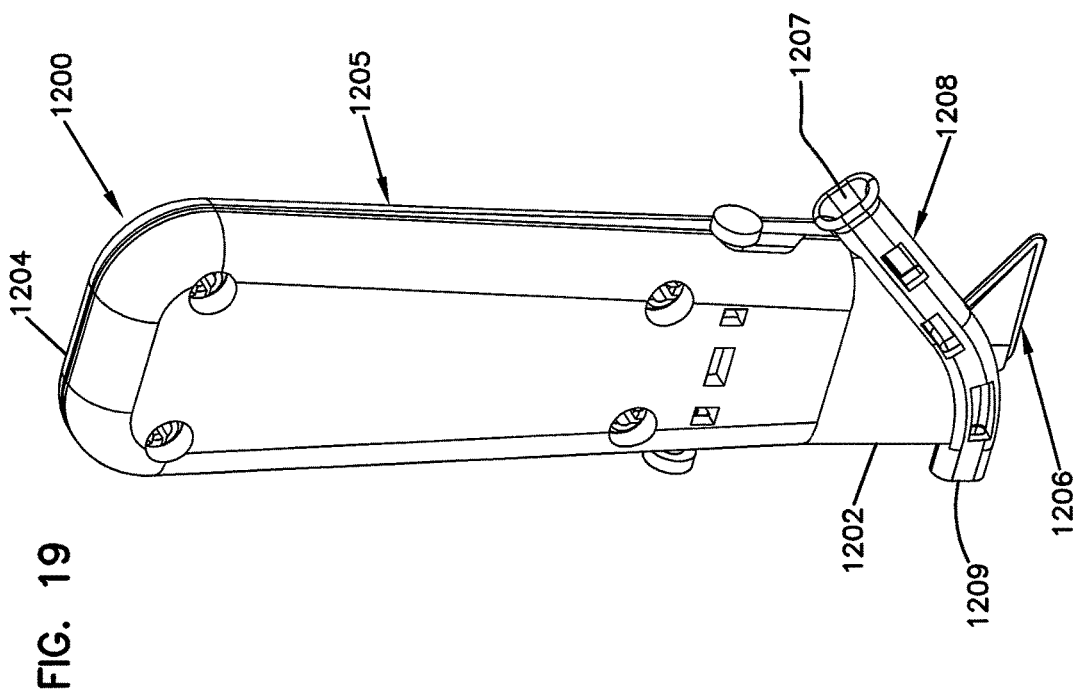

Other aspects of the present disclosure relate to systems for installing drop cable or optical fibers in a building, such as a multi-dwelling unit (e.g., a mid-rise or high-rise building). When installed, the cable carrier is used to route optical fiber 701 or fiber cable from a wall box 900 (e.g., a fiber distribution hub, drop terminal, optical network terminal, or other enclosure) to one or more optical outlet boxes 800, which provide optical connections to subscriber locations 850. Example outlet boxes 800 are shown in FIGS. 17 and 18.

One example installation system 500 in which example cable carrier 312 is deployed is shown schematically in FIG. 12. As will be understood, however, other types of cable carrier, including any of the cable carrier configurations disclosed herein, could be used in installation system 500. Generally, the installation system 500 includes a spool 501 on which the flexible cable carrier 312 is mounted and one or more spools 700 of fiber optic cable 701 (e.g., fiber optic cable having bend insensitive fibers as described above) to be paid out in the cable carrier 312. In certain embodiments, the installation system 500 includes a fiber insertion tool 600 (e.g., see FIGS. 13-16) to facilitate cable payout as will be discussed in greater detail herein.

To install the flexible cable carrier, an installer unwinds the carrier 312 from its spool 501 and cuts it into pieces of appropriate length. The pieces of the cable carrier 312 are then secured along a desired cable routing path. A wall box 900 is installed at one end of the cable routing path and one or more optical outlet boxes 800 are mounted at spaced apart locations along the cable routing path. For example, the outlet boxes/terminals 800 can be mounted at different subscriber locations 850 (e.g., apartments, residences, businesses, etc.) positioned along the cable routing path. In the example routing path shown in FIG. 12, a main trunk 312M of the cable carrier 312 extends away from the wall box 900. Multiple branches 312b of the cable carrier 312 each extends between the main trunk 312M and one of the outlet boxes 800.

The fiber optic cables/optical fibers 701 wrapped around the fiber spools 700 preferably have connectorized ends 701a, 701b. The connectorized ends 701a of the fiber optic cables/optical fibers 701 can be plugged into fiber optic adapters provided at an adapter bank 902 mounted at the wall box 900. The installer then feeds the cables/fibers 701 into the cable carrier 312. When the cables/fibers 701 are paid out, the spool 700 can be positioned within the outlet terminal 800 so that any excess fiber optic cable remaining on the spool can be stored within the outlet terminal 800. The second connectorized end 701b of the fiber optic cable 701 can be plugged into a first port of a fiber optic adapter 1000 either carried by the spool 700 or provided separately at the outlet terminal 800. A connectorized end 1002 of a fiber optic line 1004 routed into the subscriber location can be plugged into a second port of the fiber optic adapter 1000 to provide an optical connection between the line 1004 and the fiber optic cable 701.

In some embodiments, an appropriate length of the fiber optic cables/optical fibers 701 being paid out are unwound from the spools 700 and laid out next to the installed cable carrier 312. An installer then can feed the cable/fibers 701 into the carrier body 312 using a fiber insertion tool (see 600 of FIGS. 13-16). In other embodiments, the cables/fibers 701 can be installed into the carrier body 312 directly from the fiber optic spools 700 without first being laid out. For example, in one embodiment, the fiber optic spools 700 can be mounted on spindles 602 provided on the fiber insertion tool 600 (see FIGS. 13-16). In another embodiment, the fiber optic spools 700 can be coupled to a belt or other accessory worn by the installer.

In certain embodiments, the spools 700 on which the fiber optic cables/optical fibers 701 are wrapped are relatively small in diameter. In one embodiment, each of the spools upon which the fiber optic cables is wrapped has an inner diameter less than 2 inches, an outer diameter less than 6 inches and a spacing between flanges less than 2 inches. In a more preferred embodiment, each of the spools has an inner diameter less than 1.5 inches. In a still more preferred embodiment, each of the spools has an inner diameter less than 1 inch. In other embodiments, however, the spools 700 can have an outer diameter of twelve or more inches.

It is also preferred for the fiber optic cables/optical fibers 701 installed within the flexible cable carrier to be relatively small in diameter. By way of example, the fiber optic cables/optical fibers 701 can have a diameter less than 2000 microns, or less than 1500 microns, or less than 1000 microns. In certain embodiments, the fiber optic cables can include an optical fiber, a buffer layer surrounding the optical fiber, a reinforcing layer made of a material such as aramid yarn surrounding the buffer layer, and an outer jacket. In other embodiments, bare or upjacketed optical fibers are utilized instead. In certain embodiments, the fiber insertion tool can be adapted for installing 12 or more fibers or cables at one time, and the cable carriers can be sized for holding at least 12 optical fibers or cables, each having a diameter of 1.2 millimeters.

In general, the fiber insertion tool is configured to spread apart one or more portions of the carrier body 312 to provide access to the internal channel 314 as the fiber insertion tool is slid along the access opening 324 of the carrier body 312. The fiber insertion tool also is configured to route the cables/fibers 701 into the internal channel 314 from an exterior of the carrier body 312 after spreading apart the carrier body 312. More particularly, the fiber insertion tool includes a body having a plow/spreader that is configured to open the carrier body and a feeder channel that is configured to route the fibers/cables into the carrier body.

In use, the plow/spreader of the fiber insertion tool can be inserted into the main trunk 312m of the flexible cable carrier 312 of the installation system 500. The insertion tool is then moved along the length of the main trunk causing the plow to spread open a portion of the flexible cable carrier 312. As the flexible cable carrier 312 opens, the fiber insertion tool lays the fiber optic cables/optical fibers 701 into the interior channel of the flexible cable carrier 312 through the feeder channel. In one embodiment, the fiber insertion tool feeds the cables/fibers 701 into the carrier 312 from the spools 700. In another embodiment, the fiber insertion tool feeds the cables/fibers 701 into the carrier 312 from a laid out position adjacent the carrier.

When the fiber insertion tool reaches a first breakout location 505 (e.g., a location where one of the outlet boxes/terminals 800 is located), a second fiber insertion tool can be used to lay the optical cable/fibers 701 in one of the branch sections 312B of flexible cable carrier 312 that extend from a main trunk 312M of cable carrier 312 to one of the outlet terminals 800. Thereafter, the spool 700 can be positioned within the outlet terminal 800 so that any excess fiber optic cable remaining on the spool can be stored within the outlet terminal 800. The second connectorized end 701*b* of the fiber optic cable/fiber 701 can be plugged into a first port of a fiber optic adapter 1000 that is either carried by the spool 700 or provided separately at the outlet terminal 800. A connectorized end 1002 of a fiber optic line 1004 routed into the subscriber location can be plugged into a second port of the fiber optic adapter 1000 to provide an optical connection between the line 1004 and the fiber optic cable 701.

Thereafter, the fiber insertion tool is again moved along the length of the main trunk 312M of flexible cable carrier 312 and the process is repeated at various breakout locations until the desired number of fiber optic cables/optical fibers 701 routed through the main trunk 312M of flexible cable carriers 312 have each been routed to a corresponding one of the outlet boxes/terminals 800.

FIGS. 13-16 schematically depict one example embodiment of the fiber optic cable insertion tool 600 described as being usable with the installation system 500 of FIG. 12. The fiber optic cable insertion tool 600 includes a handle assembly 606 attached to the plow 604. The handle assembly 606 includes an extension arm 608 having a base end 610 attached to the plow 604 and an outer end 612 attached to a gripping member 614. As shown at FIG. 14, the handle assembly 606 can be mounted at a central position 616 of the plow 604, a leftward offset position 618 of the plow 604, or a rightward offset position 620 of the plow 604. In certain embodiments, depending on the style of carrier body being used or the location at which the carrier body is mounted, an operator can mount the handle assembly 606 at any one of the mounting positions to promote ergonomic ease of use.

The gripping member 614 is preferably removably attached to the outer end 612 of the extension arm 608. One or more dies or blades 615 for use in cutting the carrier bodies 312 can be stored within the gripping member 614. When it is desired to cut a carrier body, the gripping member 614 can be removed from the extension arm 608, the appropriate blade or die can be selected and attached to one end of the gripping member 614, and then the gripping member 614 can be used to provide the desired cut to the carrier body 312.

The plow 604 has tapered configuration suitable for opening the access location 424 as the fiber optic cable insertion tool 600 is slid along the length of the carrier body 312. The front of the plow includes a narrow front tip 624 adapted to be inserted within the interior channel of the carrier body 312. From the front tip 624, the plow widens both laterally and vertically as the plow extends in a rearward direction. The maximum width and height of the plow are selected to ensure that the cover portion 307 of the cable carrier body 312 is spread open as the plow is slid longitudinally within the interior channel of the carrier body 312. In use, the front tip 624 of the plow 604 is inserted into the interior channel of the carrier body 312 and the insertion tool is manually pushed or pulled in direction 650 (FIG. 13) by pressure applied through the handle assembly 606.

In certain embodiments, the fiber optic insertion tool 600 can include a cutting element for slitting the carrier body 312 as the fiber optic cable insertion tool is moved along the length of the carrier body 312. In other embodiments, the fiber optic insertion tool 600 can include a rip cord pulling tool for pulling the rip cord 321 from the carrier body 312 as the fiber optic cable insertion tool is moved along the length of the carrier body 312.

Figure 15:
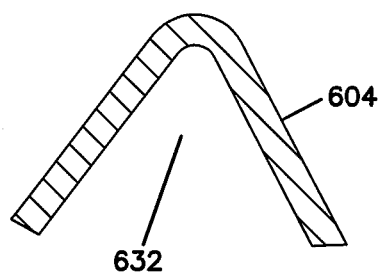
Figure 16:
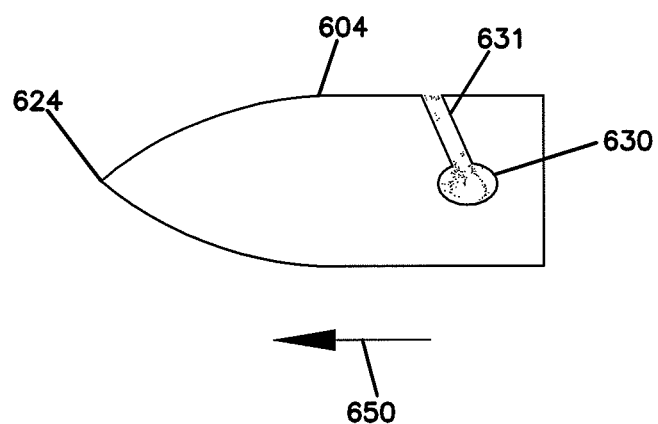

A fiber optic cable feed opening 630 is provided adjacent a rear end of the plow 604. An access slot 631 allows fiber optic cables 701 from the spools 700 to be loaded into the feed opening 630. As shown at FIG. 15, an open region 632 is defined at the underside of the plow 604. In certain embodiments, the feed opening can be rounded or can include rollers to facilitate passing the fiber optic cables 701 through the feed opening 630 with minimal friction.

In certain embodiments, spindles 602 can be provided on a bar 640 of the fiber optic cable insertion tool 600. The bar 640 can be attached to the extension arm 608 of the handle assembly 606. In one embodiment, at each breakout 505 on the main trunk 312M of the carrier 312, one of the spools 700 is removed from its corresponding spindle 602 on the fiber insertion tool 604 and placed on a spindle of the second fiber insertion tool. The spool 700 can be removed from the second fiber insertion tool and loaded into the outlet terminal 800 when the corresponding fibers have been paid out.

In use of the fiber optic cable insertion tool 600, the cable/fiber spools 700 can be mounted to the spindles 602. The fiber optic cables 701 of the spools 700 are then routed laterally into the feed opening 630 of the plow 604 through slot 631. As the plow 604 is moved along the length of the flexible cable carrier 312, the plow pushes the access location 324 of the carrier body open to form an open slot through which the extension arm 608 of the handle assembly 606 can pass. As the plow 604 moves longitudinally through the interior region of the carrier body 312, the fiber optic cables 700 are pulled from the spools 700 causing the spools to rotate to allow the fiber optic cables 701 to be paid off the spools 700. As the fiber optic cables 701 are paid off from the spools 700, the fiber optic cables 701 pass through the feed opening and are laid in the interior region of the carrier body 312.

FIGS. 17 and 18 show an example of one of the outlet boxes 800 that can be used in the system of FIG. 12. The outlet box 800 includes an enclosure 802 for housing one of the spools 700. The enclosure 802 includes a base piece 804 and a cover 806. The base piece 804 is adapted for connection to a structure such as a wall. The enclosure 802 is depicted as being generally rectangular. In one embodiments, the enclosure has a height less than about 7 inches, a width less than about 7 inches and a depth less than about 3 inches. The base piece 804 includes a spindle 806 on which the spool 700 rotatably mounts. The base piece 804 also defines a cable opening 808 through which cable 701 from the spool 700 can be dispensed. The base piece 804 can also include an access slot 810 for allowing the cable 701 to be laterally inserted into the cable opening 808.

Referring still to FIGS. 17 and 18, the spool 700 includes a first piece 710 and a second piece 712 that can be connected together (e.g., by a snap-fit connection) to form the spool 700. The first piece 710 include includes a spool flange 714 on which a plurality of adapter mounts 716 are provided. The adapter mounts 716 allow one or more of the fiber optic adapters 1000 to be mounted to the spool 700. As shown at FIG. 18, the fiber optic connector 701*b* of the fiber optic cable/optical fiber 701 is mounted in a first port of the fiber optic adapter 1000, and a dust plug 1006 is mounted in a second port of the fiber optic adapter 1000. When the spool 700 is mounted within the enclosure 802, the second port of the fiber optic adapter is configured to align with a selected opening 820 defined though the enclosure 802. Openings 820 are provided at each side of the enclosure to allow the installer to access the adapter 1000 from a variety of positions. By removing the dust plug, the connector 1002 of the subscriber line 1004 can be inserted through the opening 820 and into the second port of the fiber optic adapter 1000. In other embodiments, the subscriber line can be routed through an opening at another location (e.g., the back) of the enclosure.

The second piece 712 of the spool 700 includes a spool flange 720 and a core 722 positioned at a center of the spool flange 720. The core 722 is adapted to snap within an opening defined by the flange 714 of the first piece 710 of the spool 700. The core 722 defines an inner diameter of the spool 700 about which the fiber optic cable/optical fiber 701 is wrapped. The fiber optic cable/optical fiber 701 is wrapped about the core 720 at a location between the flanges 714, 720. A portion of the fiber optic cable 701 also passes through the flange 714 from the region between the flanges 714, 720 to a front side of the flange 714. The front side of the flange 714 includes a core extension 730 about which a portion of the fiber optic cable/optical fiber 701 nearest to the connector 701b is wrapped. Outermost portions of the flanges 714, 720 define an outer diameter of the spool 700. The spool flanges 714, 720, the core 722 and the core extension 730 are all coaxial and are situated to rotate about a common rotation axis represented by a centerline 702.

Fiber optic cable from the spool 700 can be dispensed from the spool while the spool is located within the enclosure 802. For example, the enclosure 802 can be mounted to a structure (e.g., a wall) and the connectorized end 701a of the fiber optic cable 701 can be pulled causing the spool 700 to rotate within the enclosure about the spindle thereby allowing fiber optic cable to be paid out through the opening 808. For example, the fiber optic cable/optical fiber 701 can be pulled from the enclosure 802 and the end 701a can be plugged into a wall box such as wall box 900 of FIG. 12. Alternatively, the end 701a can be plugged into wall box 900, and the installer can then move the enclosure 802 to the desired mounting location while the spool 700 spins within the enclosure 802 to allow the fiber optic cable/optical fiber 701 to be paid out from the enclosure as the enclosure 802 is moved away from the wall box 900. Further, the fiber optic cable/optical fiber 701 can be paid off the spool 700 which the spool 700 is outside the enclosure (as described with respect to the system of FIG. 12), and the spool 700 can be loaded into the enclosure 802 after the fiber optic cable 701 has been paid out.

FIGS. 19-60 illustrate various views of another example fiber insertion tool 1200 having features that are examples of inventive aspects in accordance with the principles of the present disclosure. The example fiber insertion tool 1200 includes a body 1205 defining a plow/spreader tool 1206 and a feeder channel 1208. The plow/spreader tool 1206 is configured to spread apart one or more portions of a carrier body to provide access to the internal channel as the fiber insertion tool 1200 is slid along the access opening of the carrier body. The feeder channel 1208 defines a pathway along which cables/fibers 701 are routed into the internal channel from an exterior of the carrier body.

In use, a user mounts carrier molding to a surface (e.g., using an adhesive backing on the carrier molding). The user pays off cable/fiber from a spool along the length of the carrier molding. For example, the user can mount the carrier molding to a wall adjacent the ceiling and pay off the cable/fiber on the floor along the wall. The user loads the cable/fiber into the feeder channel 1208 of the insertion tool 1200, inserts the plow 1206 into an opening of the carrier molding, and slides the insertion tool 1200 along the carrier molding to pay out the cable/fiber into the carrier molding.

The body 1205 can include a support section 1202 and a handle section 1204 that facilitates manipulation of the support section 1202 during cable/fiber payout. In some embodiments, the handle section 1204 is thicker than the support section 1202. For example, the support section 1202 can have a thickness $T_1$ that is less than a thickness $T_2$ of the handle section 1204 (see FIG. 25). In one example, the thickness $T_1$ of the support section 1202 is sufficiently thin to enable the support section 1202 to fit through the opening defined in a carrier body that leads to the inner channel. In other embodiments, only the plow 1206 and the feeder 1208 are sufficiently thin to fit within the opening of the carrier body.

Figure 23:
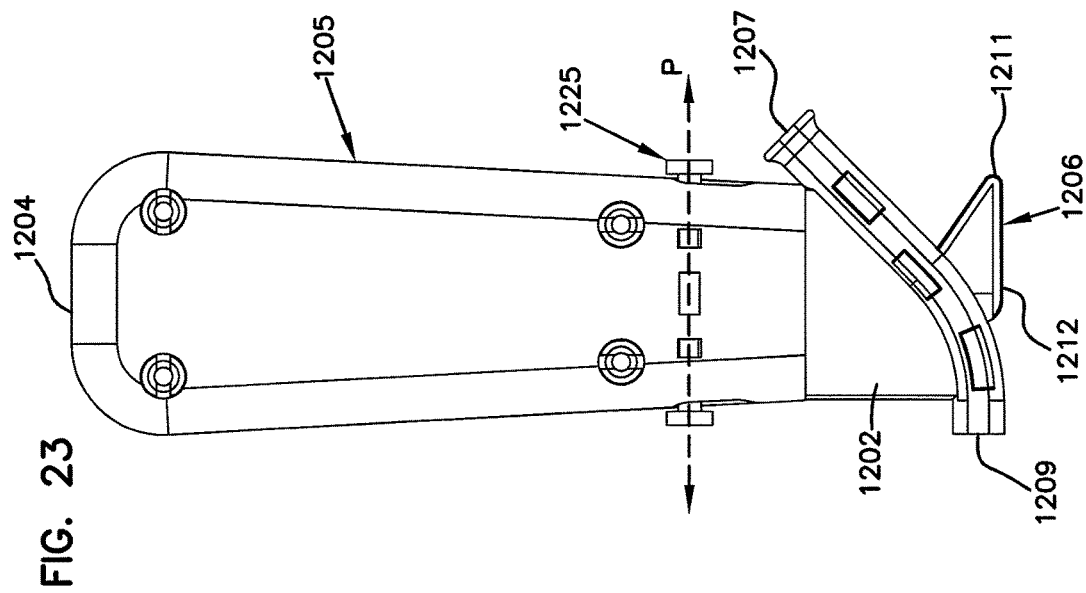
FIGS. 23 and 24 are first and second side views, respectively, of the example insertion tool of FIGS. 19 and 20 in accordance with the principles of the present disclosure.
Figure 25:
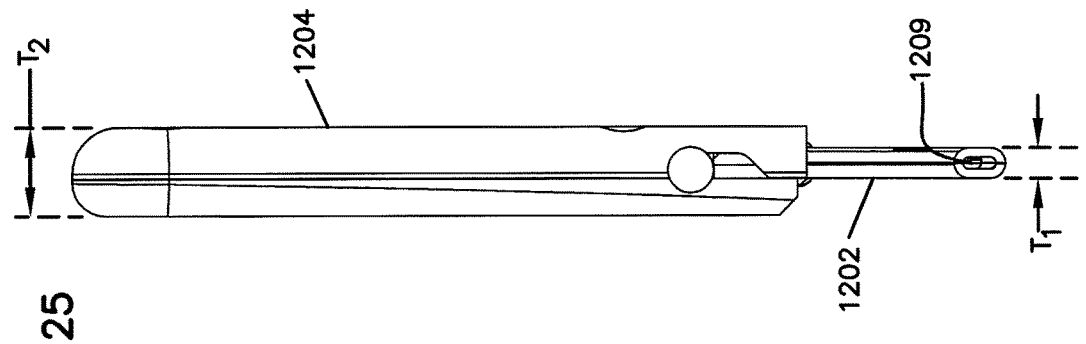
FIGS. 25 and 26 are first and second end views of the example insertion tool of FIGS. 19 and 20 in accordance with the principles of the present disclosure.
Figure 26:
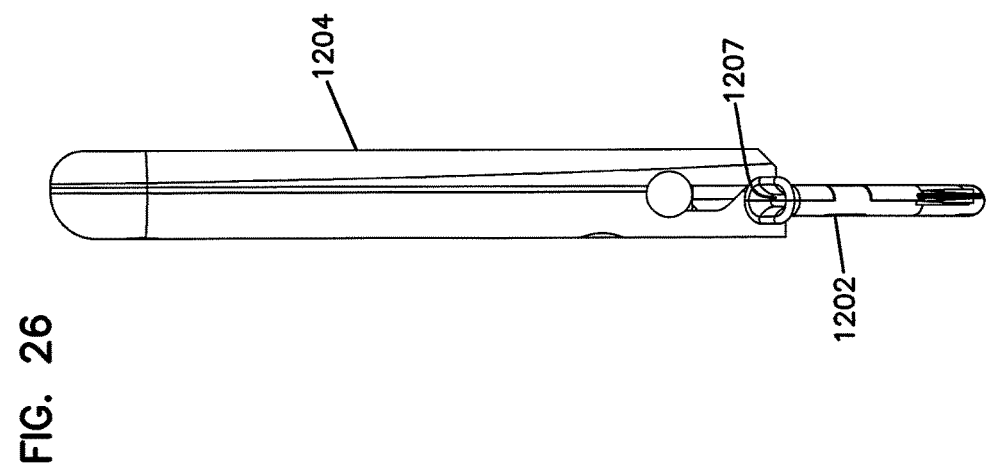
Figure 27:
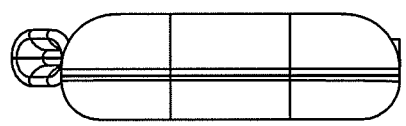
FIGS. 27 and 28 are top and bottom plan views, respectively, of the example insertion tool of FIGS. 19 and 20 in accordance with the principles of the present disclosure.
Figure 24:
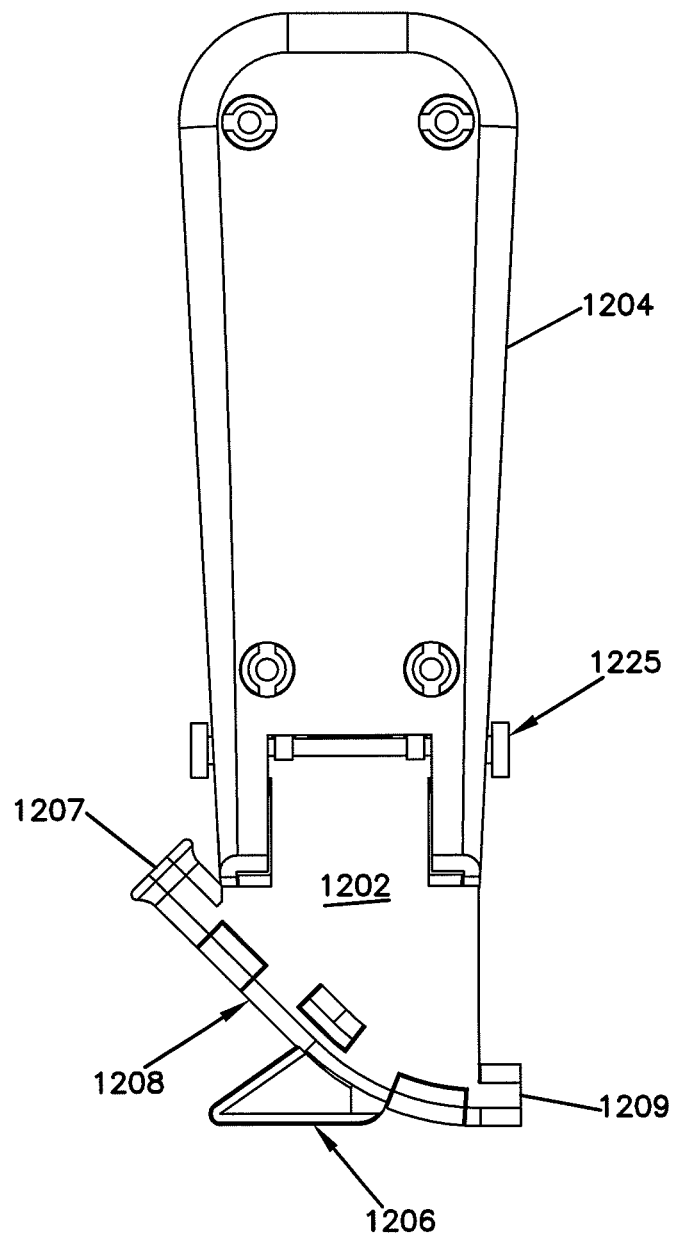
Figure 28:
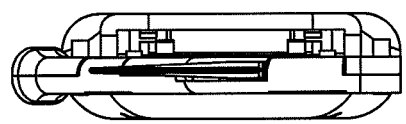

Some example handles 1204 widen out as the handle 1204 extends away from the support section 1202 (e.g., see FIG. 23). Other example handles 1204 can taper inwardly or remain a constant width along their length. In the example shown in FIG. 23, the handle 1204 defines opposite planar surfaces connected by a rounded edge. Other example handles can define other shapes, such as cylindrical shapes, frustro-conical shapes, or organic shapes. Some example handles also can define finger grooves or other gripping features to accommodate the user's hands or to otherwise facilitate gripping of the handle 1204.

When the insertion tool 1200 is used during cable/fiber payout, the plow 1206 is inserted into the opening of the carrier body and pulled in a travel direction (e.g., using the handle 1204). In some embodiments, the plow 1206 extends outwardly from the body 1205 in the travel direction. In certain examples, the plow 1206 tapers inwardly as the plow 1206 extends away from the body 1205. In the example shown in FIG. 23, the plow 1206 defines a wedge shape having a rounded tip 1211. In other examples, the plow 1206 can define a pointed tip or a flat edged tip. In still other embodiments, the plow 1206 can define other shapes, such as more rounded or organic shapes.

In some embodiments, the plow 1206 has a blade 1212 along at least one edge of the plow. In the example shown in FIG. 23, the blade 1212 extends along upper and lower edges of the plow 1206. One example blade 1212 can be molded from a softer material than the remainder of the plow 1206, for example, using overmolding techniques. In other embodiments, the plow 1206 can have a monolithic construction. In some such example, the blade 1212 can have a different thickness than the remainder of the plow 1206. For example, the blade 1212 can be thinner than the remainder of the plow 1206 (e.g., see FIGS. 22 and 54).

The feeder channel 1208 extends from a first end 1207 to a second end 1209. In general, the fibers/cables enter the feeder channel 1208 at the first end 1207 and exit the feeder channel 1208 from the second end 1209. In the example shown in FIGS. 19-23, the first end 1207 faces the travel direction and the second end 1209 faces in a generally opposite direction. In other embodiments, the first and second ends 1207, 1209 can face in other directions. For example, the second end 1209 can face in a downward direction extending away from the handle.

In some embodiments, the feeder channel 1208 defines a sufficient curve to maintain a minimum bend radius of the fibers/cables as the fibers/cables are being paid out. In the example shown, the feeder channel 1208 defines a curve so that the first end 1207 extends generally upwardly and the second end 1209 extends generally in line with the plow 1206 (see FIG. 23). Accordingly, the fibers/cables are fed into the internal channel of a molded carrier as the plow 1206 opens the carrier body.

Some example feeder channels 1208 are substantially enclosed as shown in FIGS. 19, 21, 25, and 26. Such feeder channels 1208 contain and protect the fibers/cables routed through the feeders 1208. One such feeder channel 1208 can define a substantially cylindrical transverse cross-section. Another such feeder channel 1208 can define a substantially oval transverse cross-section (e.g., see FIG. 25). Other example feeder channels include grooves or open slots defined within a surface. Such channels can include retaining flanges to retain the fibers/cables within the channels.

The body 1205 of the insertion tool 1200 can be formed from one or more pieces. In some embodiments, the support section 1202 includes a first section 1221 pivotally coupled to a second section 1222 at a hinge 1225. In the example shown, the hinge 1225 includes a pivot rod 1231 having stops 1234 arranged on either end (see FIGS. 42-46). The pivot rod 1231 extends along a pivot axis P (see FIGS. 23 and 30). The second section 1222 of the support section 1202 is configured to mount pivotally or rotatably to the pivot rod 1231 using couplers 1232. In another embodiment, the second section 1222 can define the pivot rod 1231. The hinge 1225 is coupled to the body 1205 of the insertion tool as will be discussed in greater detail herein.

In certain embodiments, each section 1221, 1222 defines a portion of the feeder channel 1208. In the example shown in FIGS. 29-31, the first section 1221 defines a first portion 1223 of the feeder channel 1208 and the second section 1222 defines a second portion 1224 of the feeder channel (see FIGS. 32-41). In the example shown, each portion 1223, 1224 defines about half of the feeder channel 1208. In other embodiments, however, one of the sections may define a greater portion of the feeder channel 1208 than the other section.

One of the sections 1221, 1222 can be pivoted open (i.e., away from the other section) to arranged the feeder channel 1208 in an open configuration. Arranging the feeder channel 1208 in the open configuration provides access to the interior of the feeder channel 1208. Accordingly, opening the feeder channel 1208 can facilitate initial loading of fibers/cables into the feeder channel 1208. In the example shown in FIGS. 29-31, only the second section 1222 pivots relative to the handle 1204. In other embodiments, however, both sections 1221, 1222 can be pivotally mounted to the handle 1204.

In some embodiments, the plow 1206 is fully defined by one of the sections. In the example shown, the plow 1206 is fully defined by the second (i.e., pivotally mounted) section 1222. In another embodiment, the plow 1206 can be fully defined by the first (i.e., non-pivotally mounted) section 1221. In other embodiments, each section 1221, 1222 can define a portion of the plow 1206. For example, each section 1221, 1222 may define a half-section of the plow 1206.

Figure 29:
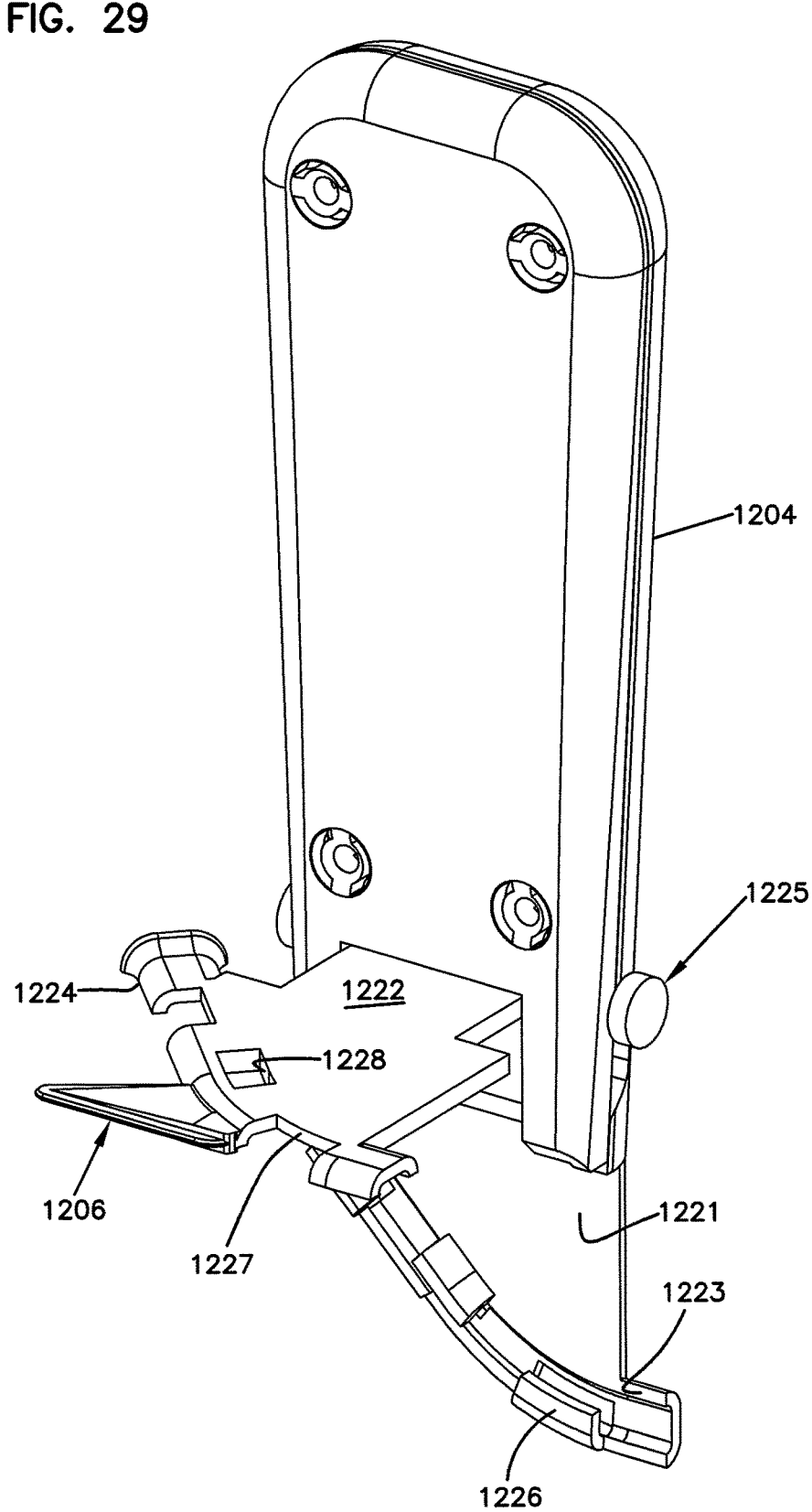
FIGS. 29-31 show the example insertion tool of FIGS. 19 and 20 with a pivoting section arranged in an open position in accordance with the principles of the present disclosure.
Figure 30:
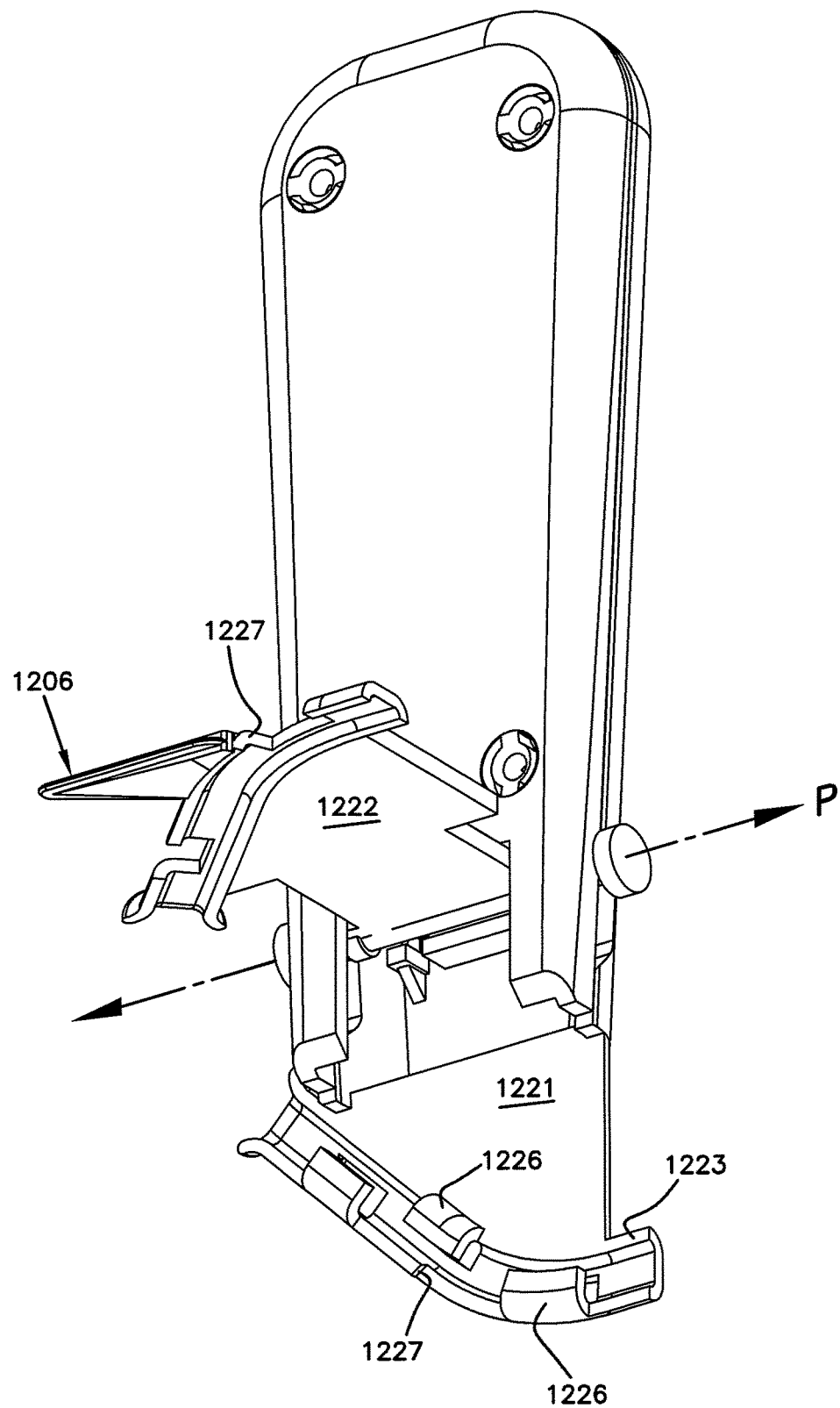
Figure 31:
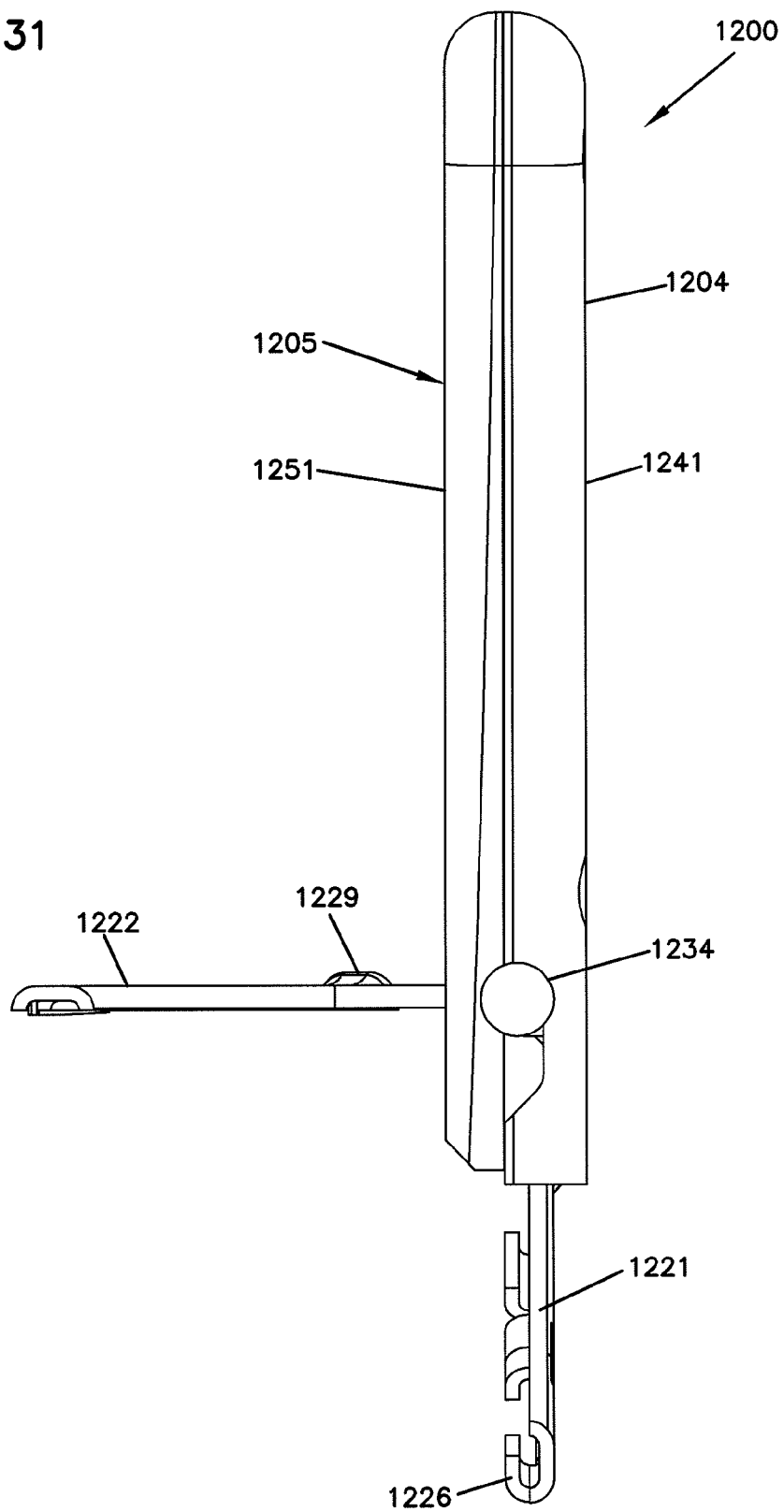
Figure 32:
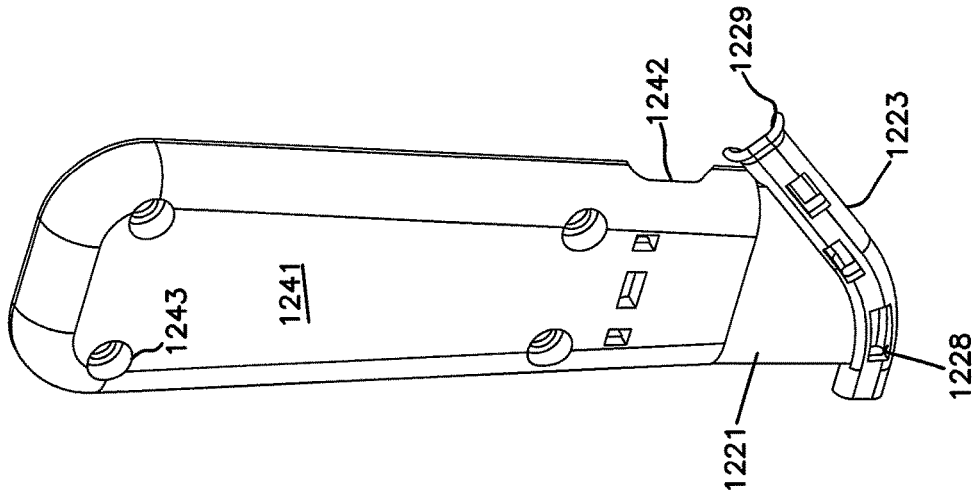
FIGS. 32 and 33 are first side perspective views of an example base section of an insertion tool for use in the cable installation systems described herein in accordance with the principles of the present disclosure.
Figure 33:
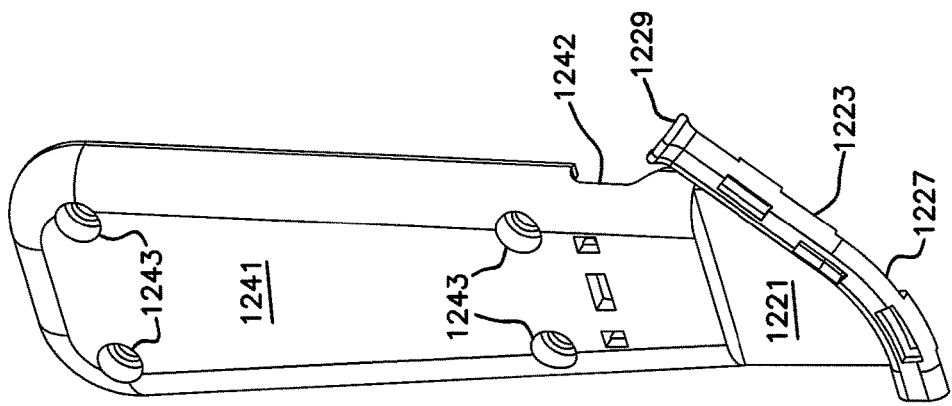
Figure 35:
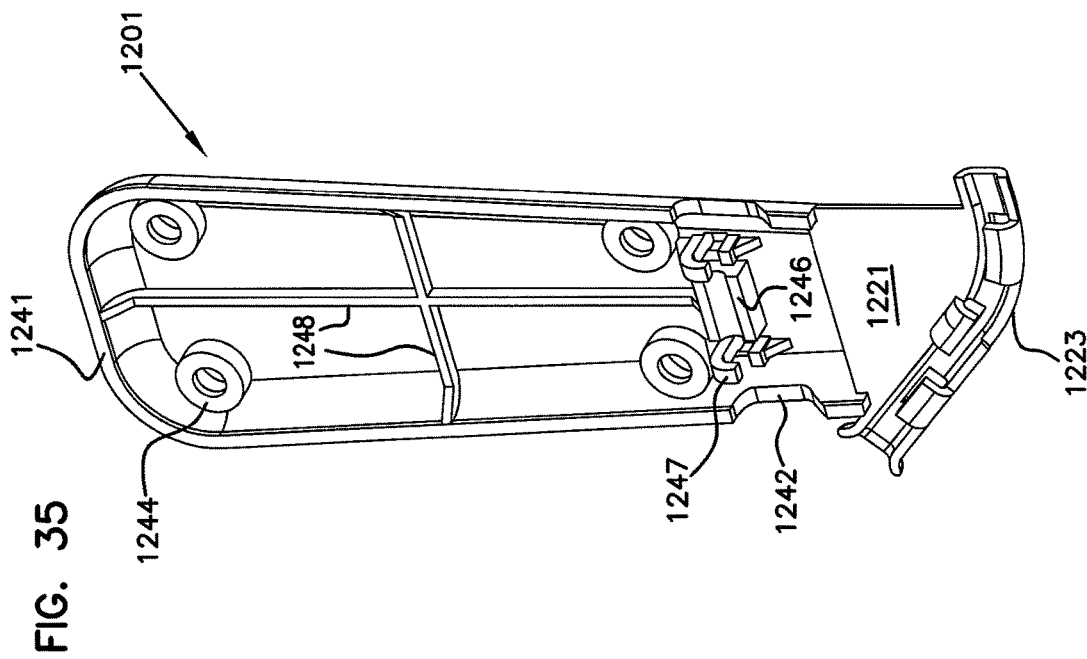
FIGS. 34 and 35 are second side perspective views of the example base section of FIGS. 32 and 33 in accordance with the principles of the present disclosure.
Figure 34:
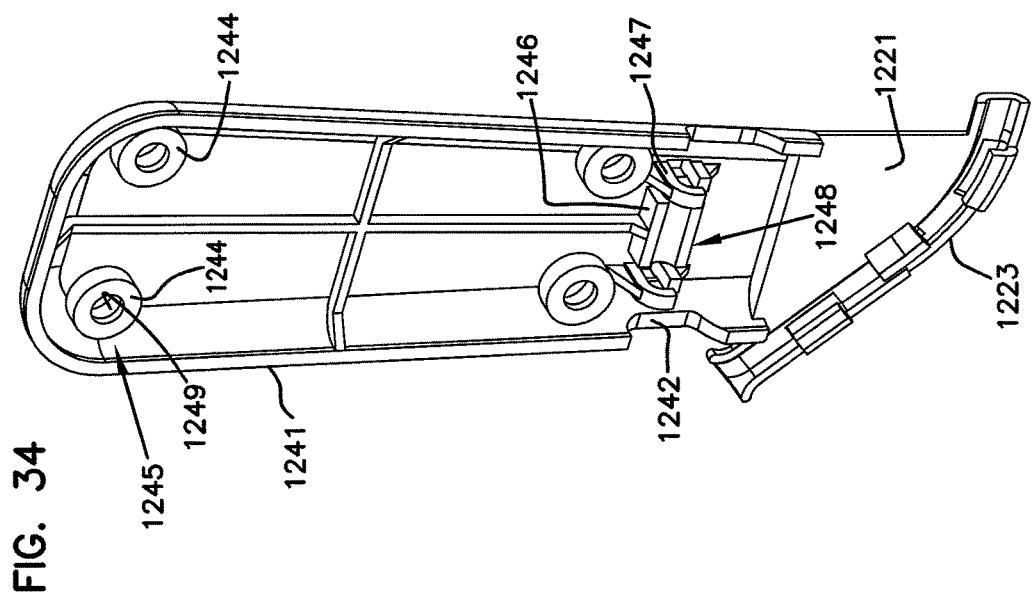
Figure 36:
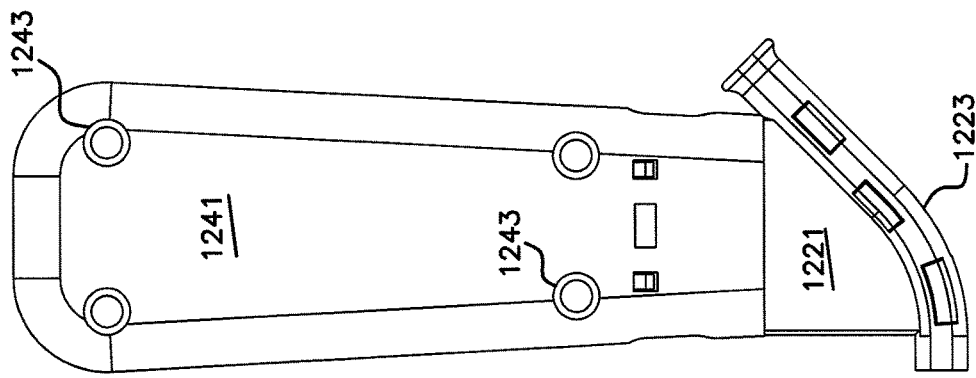
FIGS. 36 and 37 are first and second side views, respectively, of the example base section of FIGS. 32 and 33 in accordance with the principles of the present disclosure.
Figure 38:
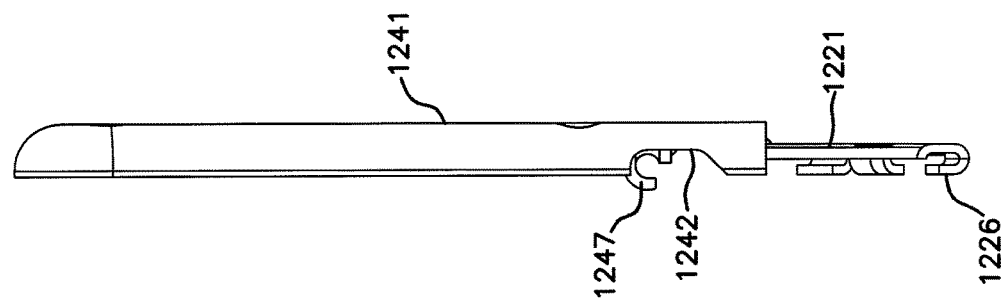
FIGS. 38 and 39 are first and second end views of the example base section of FIGS. 32 and 33 in accordance with the principles of the present disclosure.
Figure 39:
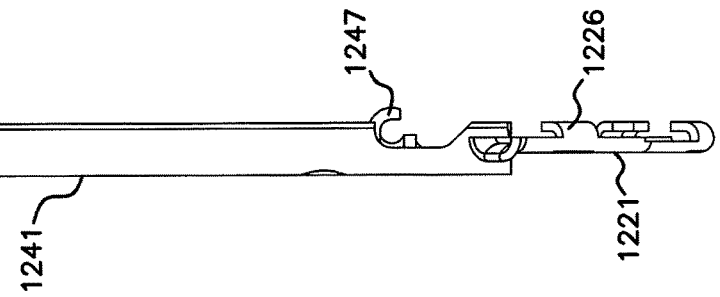
Figure 40:
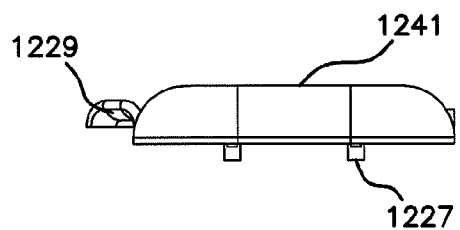
FIGS. 40 and 41 are top and bottom plan views, respectively, of the example base section of FIGS. 32 and 33 in accordance with the principles of the present disclosure.
Figure 37:
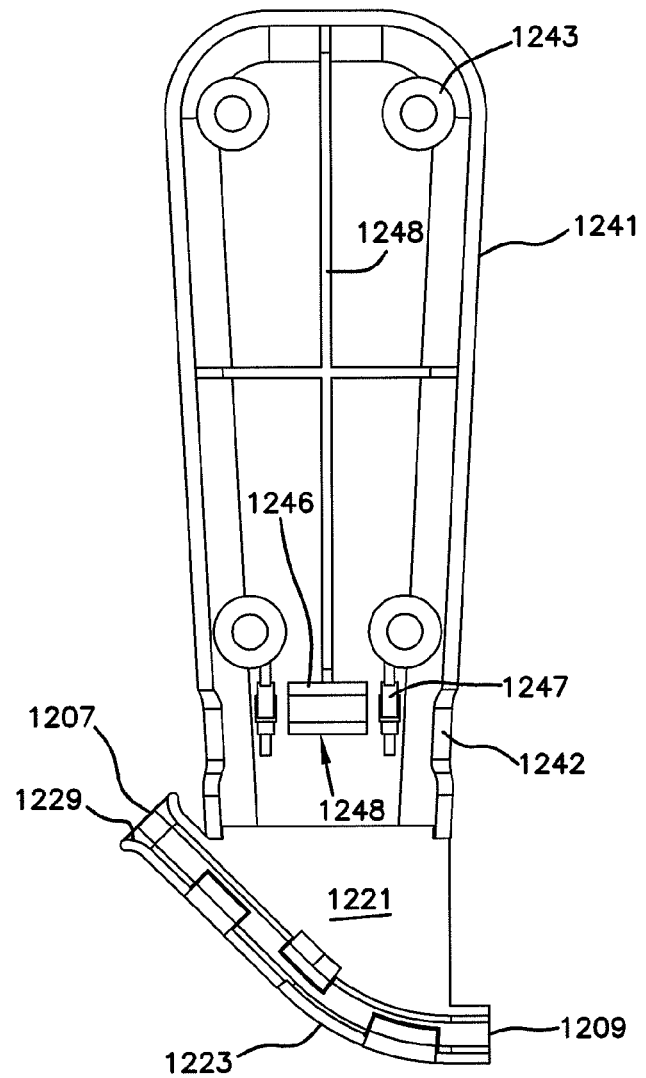
Figure 41:
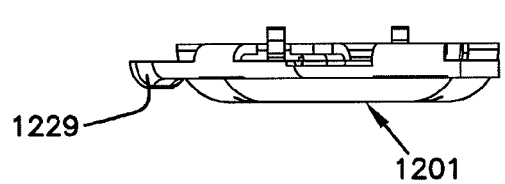
Figure 42:
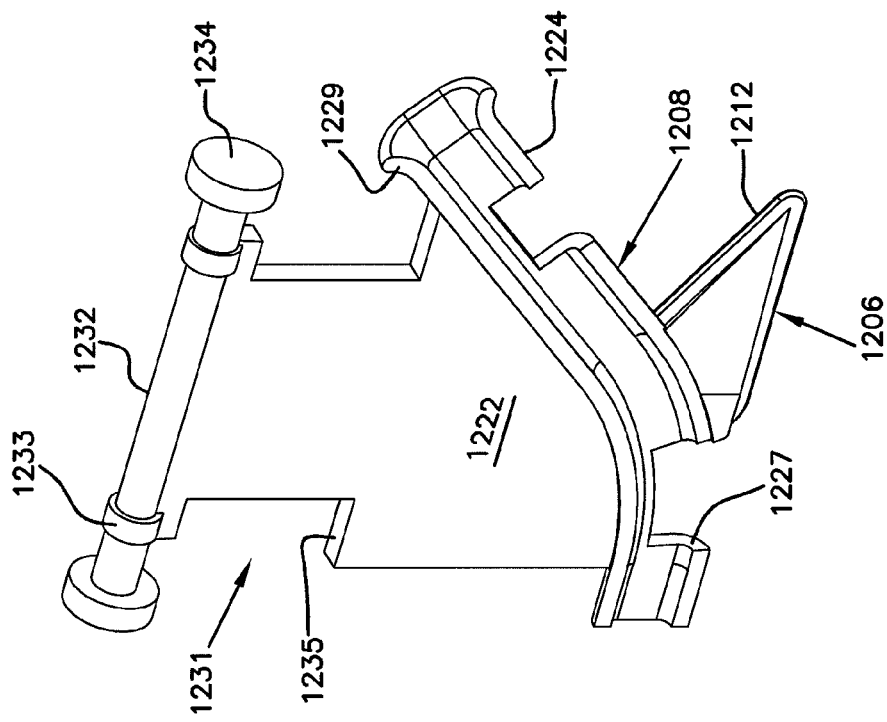
FIGS. 42 and 43 are first side perspective views of an example pivoting section of an insertion tool for use in the cable installation systems described herein in accordance with the principles of the present disclosure.
Figure 43:
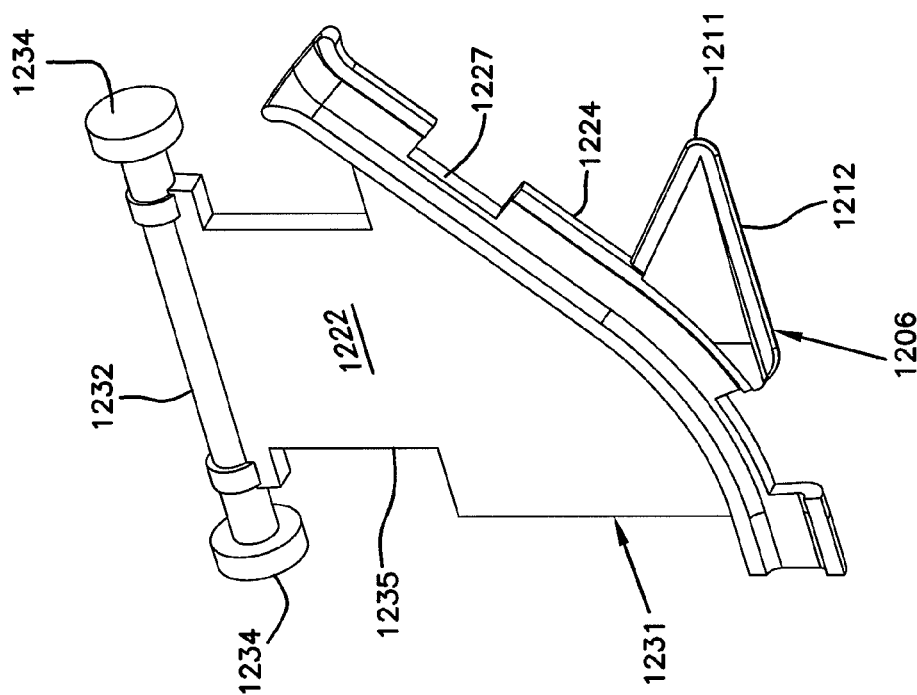
Figure 45:
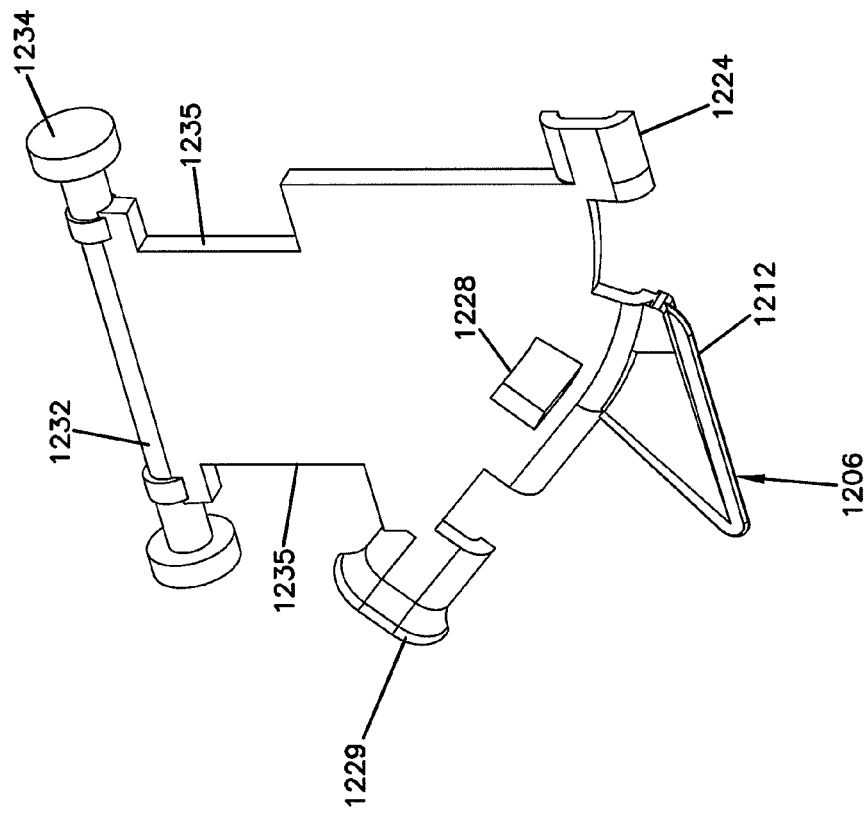
FIGS. 44 and 45 are second side perspective views of the example pivoting section of FIGS. 42 and 43 in accordance with the principles of the present disclosure.
Figure 44:
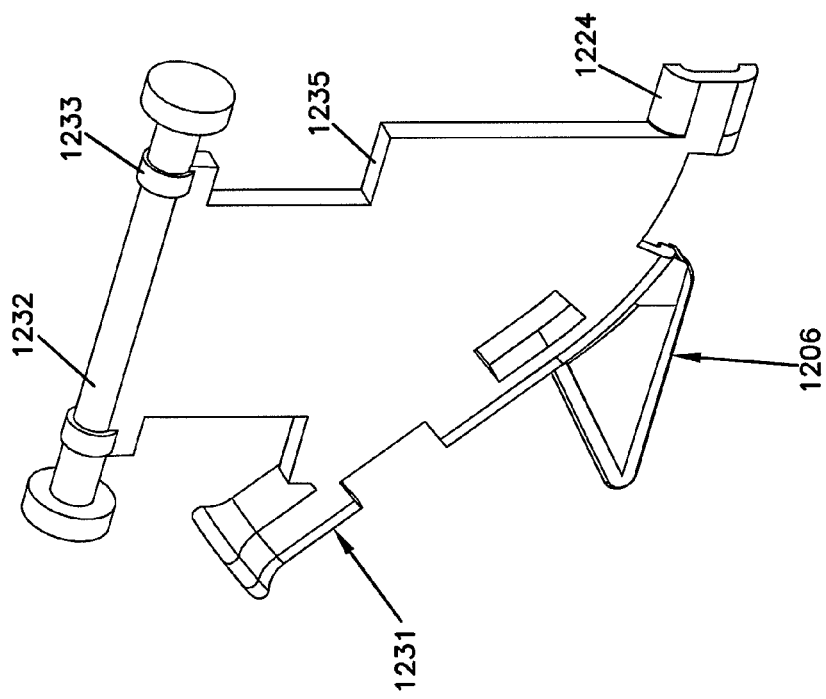
Figure 48:
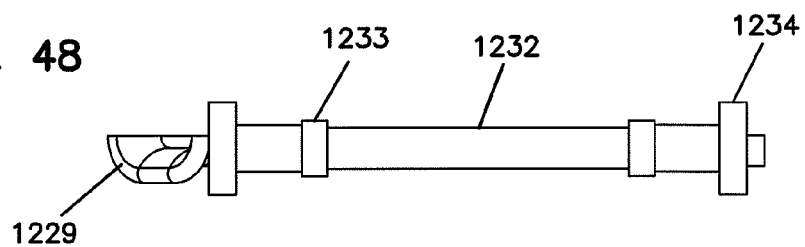
FIGS. 48 and 49 are first and second end views of the example pivoting section of FIGS. 42 and 43 in accordance with the principles of the present disclosure.
Figure 46:
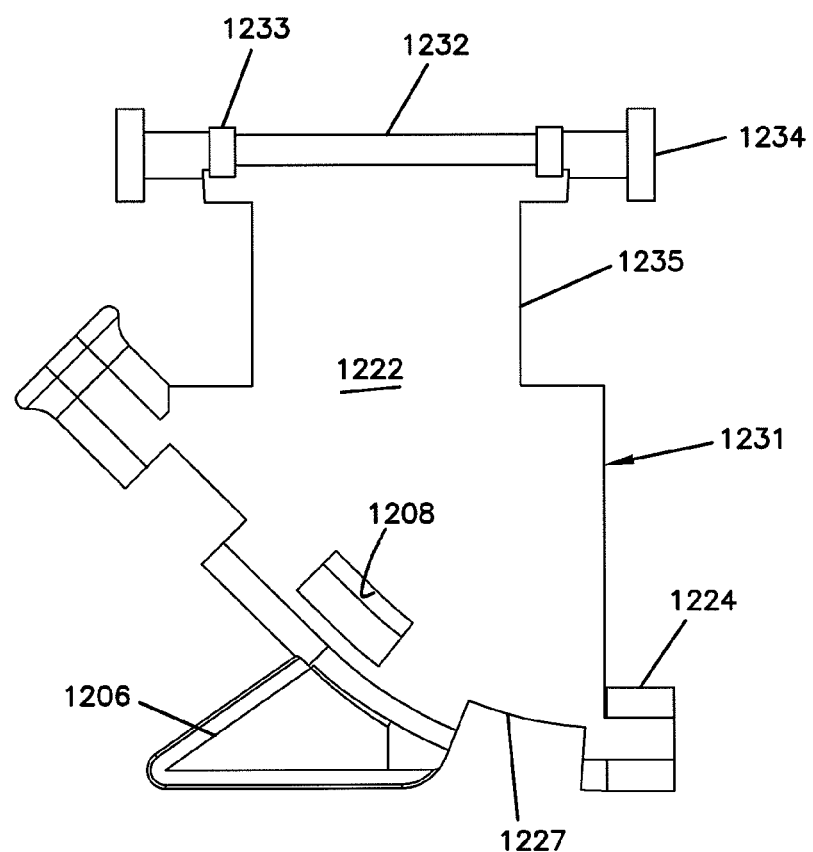
FIGS. 46 and 47 are first and second side views, respectively, of the example pivoting section of FIGS. 42 and 43 in accordance with the principles of the present disclosure.
Figure 49:
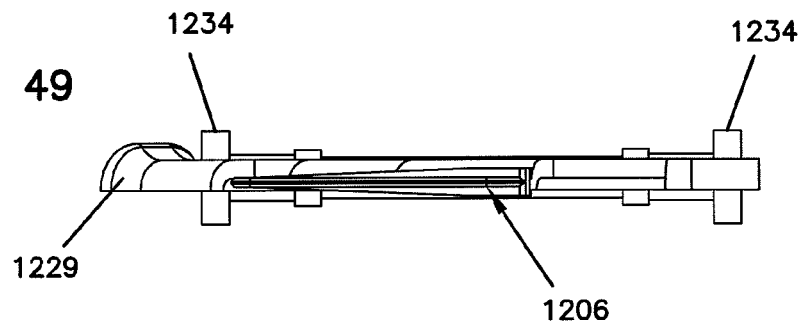
Figure 47:
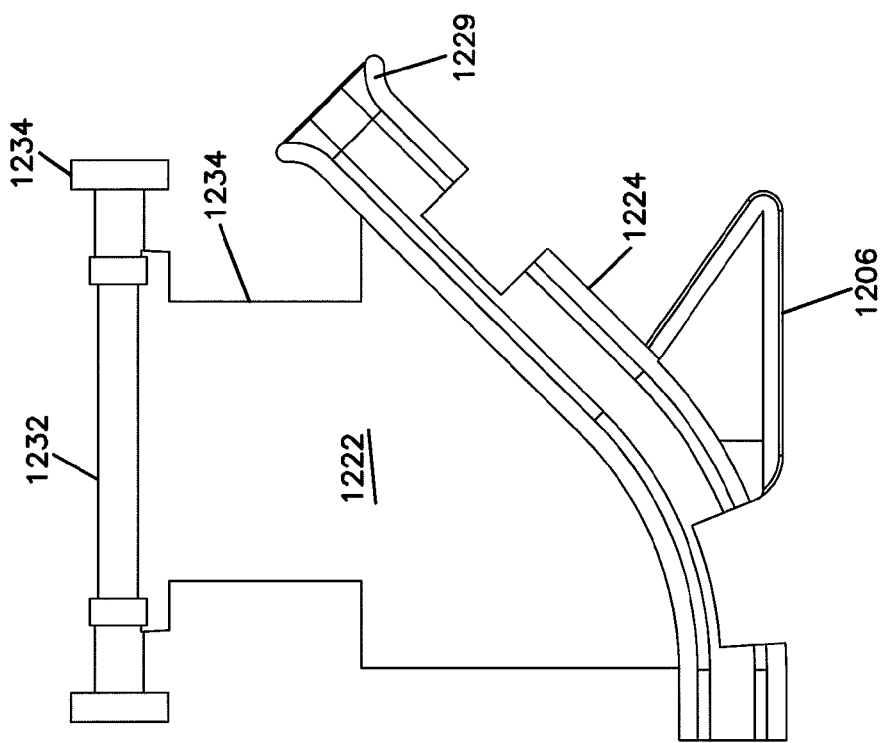
Figure 51:
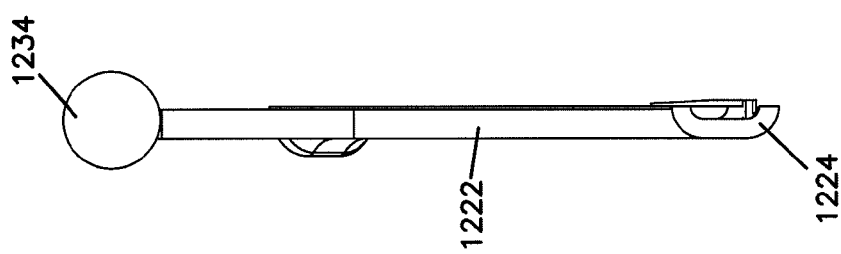
FIGS. 50 and 51 are top and bottom plan views, respectively, of the example pivoting section of FIGS. 42 and 43 in accordance with the principles of the present disclosure.
Figure 50:
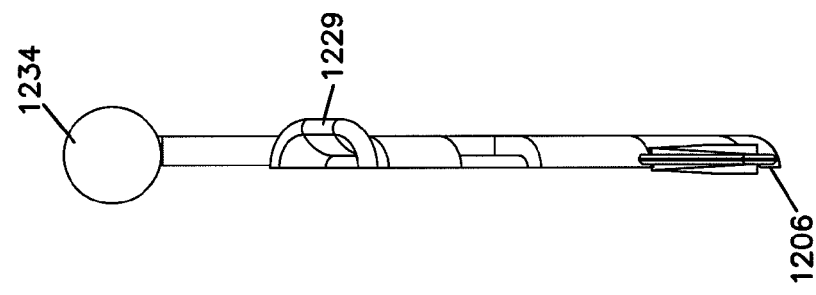
Figure 52:
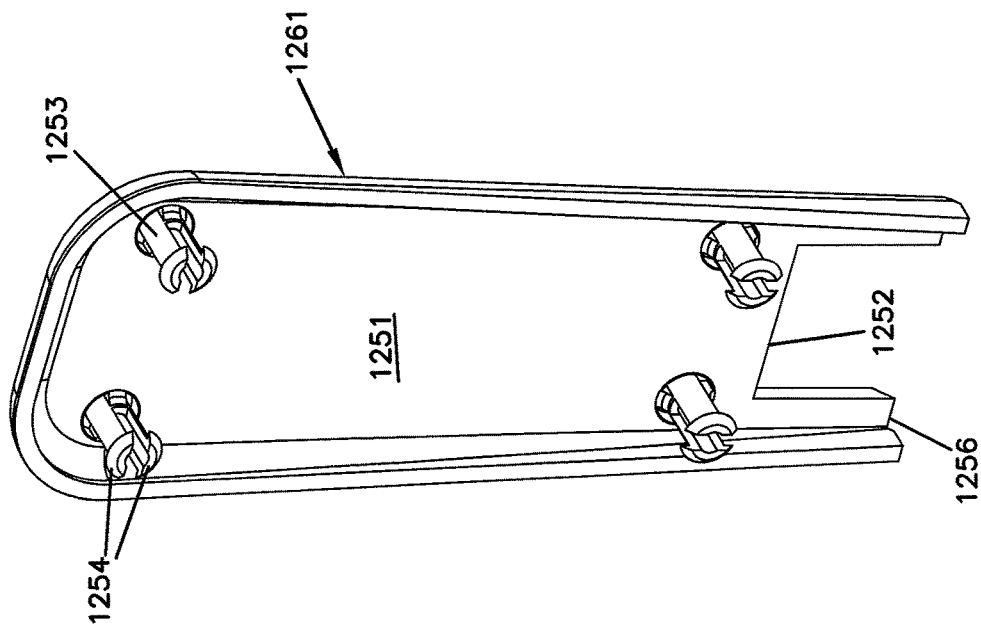
FIGS. 52 and 53 are first side perspective views of an example covering section of an insertion tool for use in the cable installation systems described herein in accordance with the principles of the present disclosure.
Figure 53:
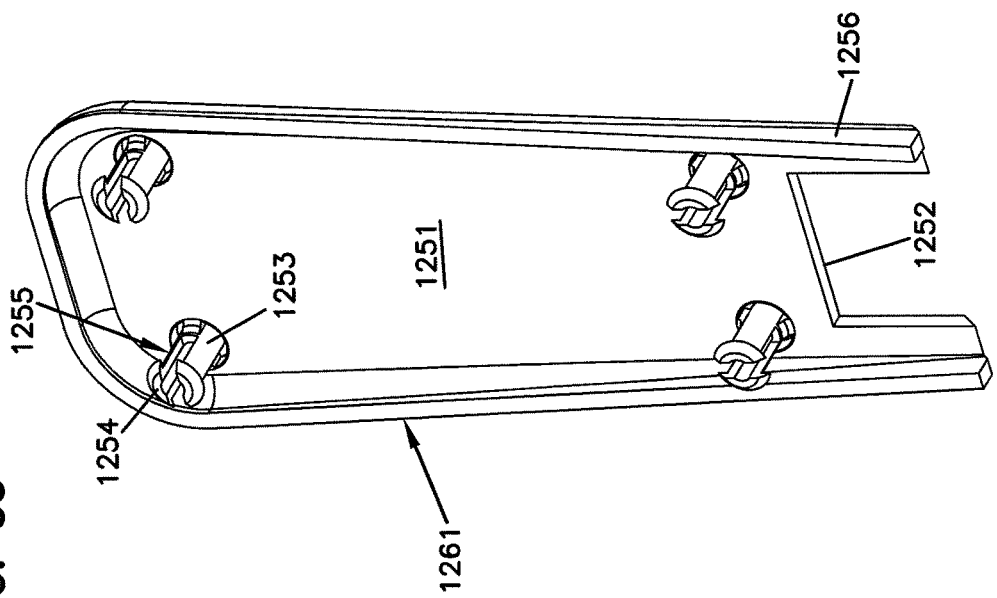
Figure 55:
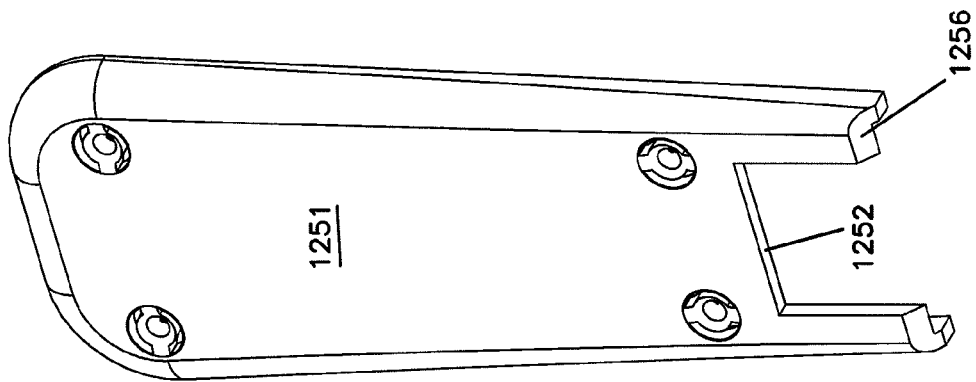
FIGS. 54 and 55 are second side perspective views of the example covering section of FIGS. 52 and 53 in accordance with the principles of the present disclosure.
Figure 54:
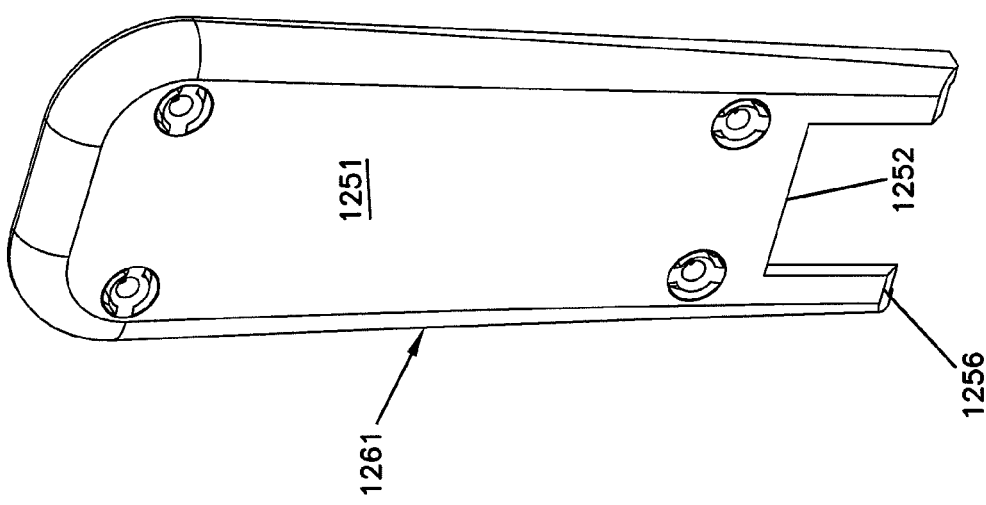
Figure 58:
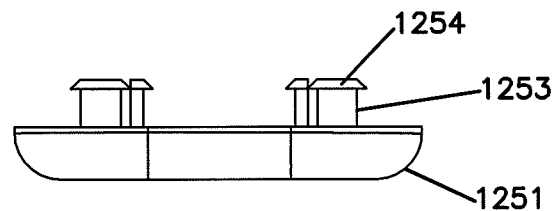
FIGS. 58 and 59 are first and second end views of the example covering section of FIGS. 52 and 53 in accordance with the principles of the present disclosure.
Figure 56:
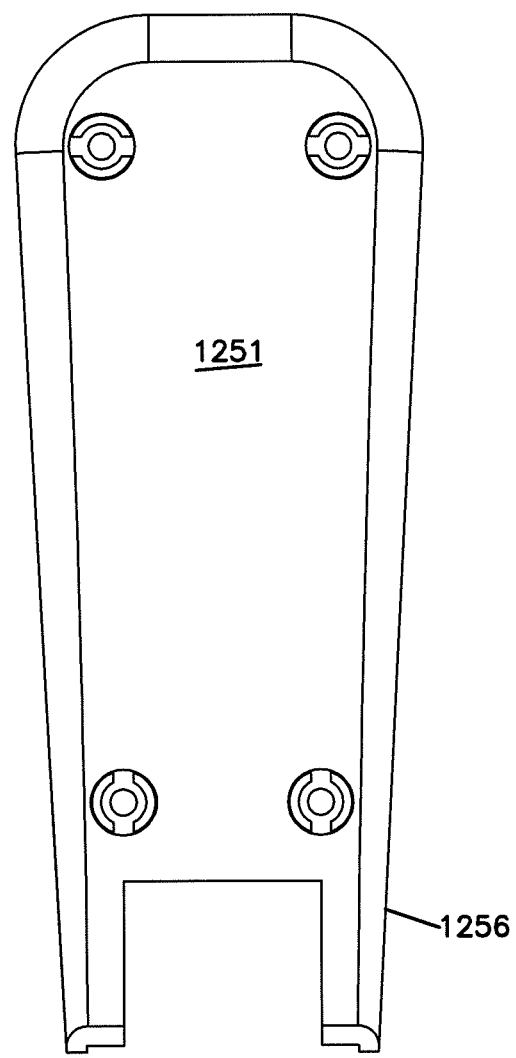
FIGS. 56 and 57 are first and second side views, respectively, of the example covering section of FIGS. 52 and 53 in accordance with the principles of the present disclosure.
Figure 59:
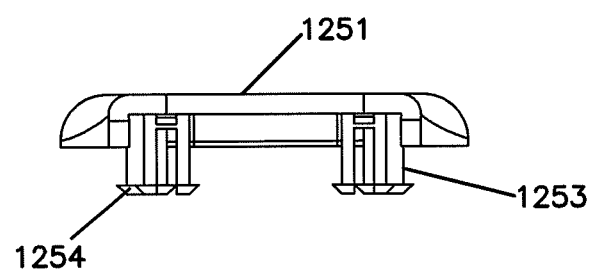
Figure 57:
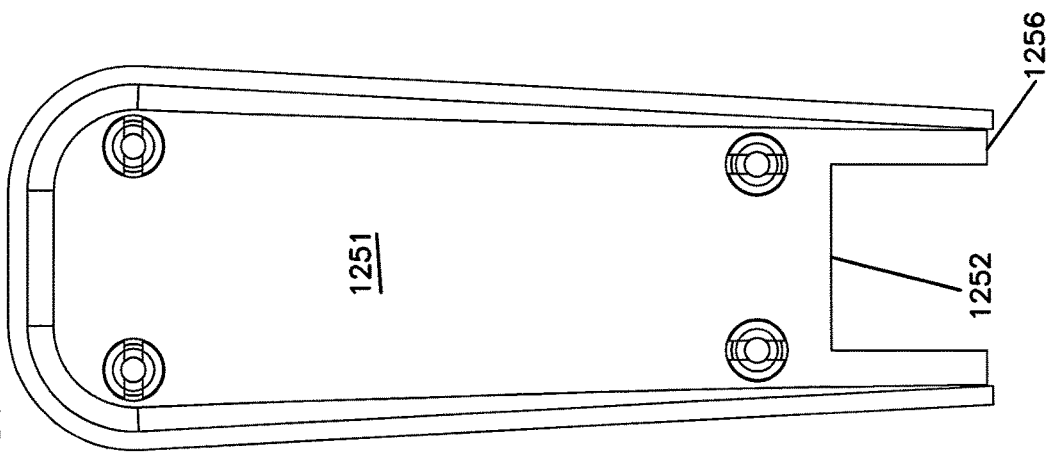
Figure 61:
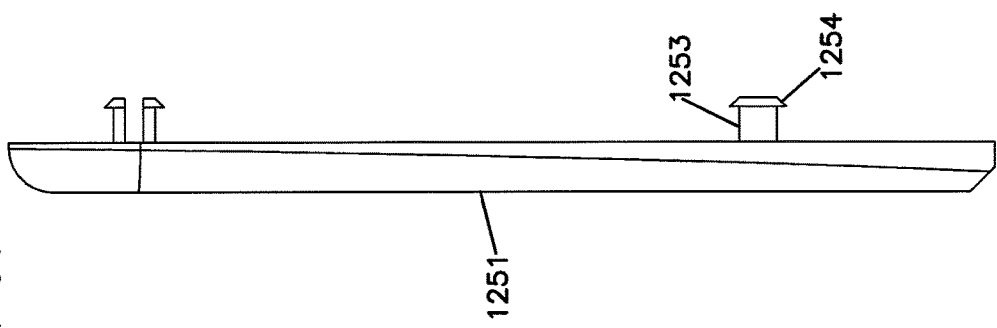
FIGS. 60 and 61 are top and bottom plan views, respectively, of the example covering section of FIGS. 52 and 53 in accordance with the principles of the present disclosure.
Figure 60:
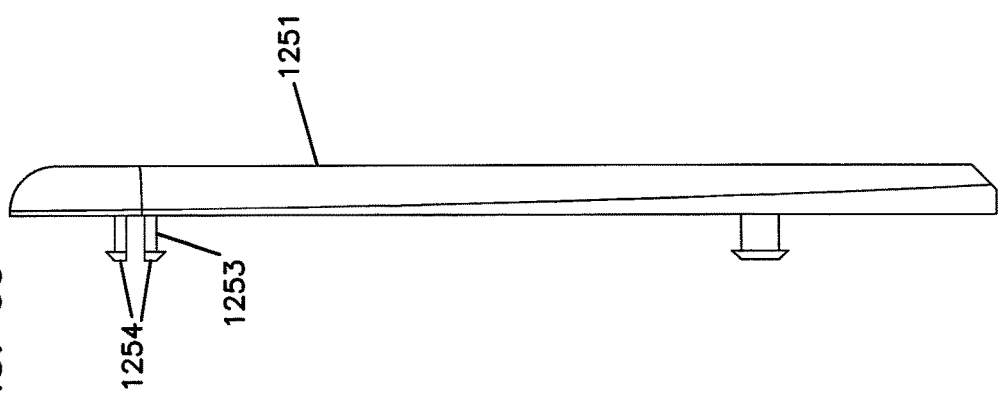

In some embodiments, the first and second sections 1221, 1222 are held together using first retention features. In one example, the first retention features are detent features. For example, as shown in FIGS. 29-31, each of the sections 1221, 1222 can include flanges 1226 and can define cutout portions 1227, 1228 into which the flanges can snap to secure the sections together. As shown in FIG. 29, the sections 1221, 1222 can define open cutout portions 1227 and/or closed cutout portions 1228 to receive the flanges 1226. In one embodiment, the flanges 1226 extend and curve inwardly from the respective sections to facilitate retention of the fibers/cables in the feeder channels 1208 when the feeder channel is arranged in an open configuration.

In some embodiments, the handle 1204 of the insertion tool 1200 also can include two or more sections. For example, as shown in FIG. 31, one example handle 1204 includes a first member 1241 and a second member 1251 that cooperate to house the hinge 1225. In certain embodiments, the members 1241, 1251 fasten together using second retention features. For example, the second retention features can include snap or latch features. In the example shown, the second retention features include protrusions 1255 that snap or latch into receptacles 1245.

In certain embodiments, the insertion tool 1200 can be formed in three parts. For example, a pivoting piece 1231 and a cover piece 1251 can be mounted to a base piece 1201. One example base piece 1201 is shown in FIGS. 32-41; one example pivoting piece 1231 is shown in FIGS. 42-51; and one example cover piece 1261 is shown in FIGS. 52-61. In other embodiments, however, the insertion tool 1200 can be formed from one, two, four, or more pieces. For example, the insertion too 1200 can be formed from two clam-shell pieces. In another embodiment, the insertion too 1200 can be integrally formed.

Referring to FIGS. 32-41, one example base piece 1201 of the insertion tool 1200 includes the first section 1221 of the support section 1204 and the first member 1241 of the handle 1204. The first section 1221 includes the first portion 1223 of the feeder channel 1208. The first member 1241 of the handle 1204 can be reinforced with ribs 1248. In one example embodiment, the base piece 1201 can be formed (e.g., injection molded) as a unitary piece.

In the example shown, the base piece 1201 also includes a mounting structure 1248 at which the hinge 1225 can be mounted. In some embodiments, the mounting structure 1248 includes a cradle 1246 and retaining arms 1247 configured to hold the hinge 1225. In the example shown, the mounting structure 1248 includes a retaining arm 1247 arranged on opposite sides of the cradle 1246. When assembled, a pivot rod 1232 of the hinge 1225 fits in the cradle 1226 and snaps into the retaining arms 1247. In certain embodiments, the base piece 1201 also defines cutouts 1242 sized and configured to accommodate ends 1234 of the pivot rod 1232. In other embodiments, the mounting structure 1248 or another type of mounting structure 1248 can be arranged on the cover piece 1261 or another pieces of the insertion tool 1200.

Referring to FIGS. 42-51, one example pivoting piece 1231 of the insertion tool 1200 includes the second section 1222 of the support section 1204 and the hinge 1225. In the example shown, the second section 1222 includes the second portion 1224 of the feeder channel 1208 and the plow 1206. In other embodiments, the plow 1206 can be arranged on the base piece 1201 or can be split between the base piece 1201 and the pivoting piece 1231. In the example shown, the second section 1222 defines cutouts 1235 to accommodate the cover piece 1261 disclosed in greater detail herein.

In some embodiments, the second section 1222 is pivotally coupled to a pivot rod 1232 of the hinge 1225 by couplers 1233. Enlarged tips 1234 are arranged on each end of the pivot rod 1232. In one embodiment, the enlarged tips 1234 retain the couplers 1233 on the pivot rod 1232. As discussed above, the pivot rod 1232 can be snap fit into retaining structure 1248 of the base piece 1201 to pivotally mount the pivoting piece 1231 to the base piece 1201. When the hinge 1225 is secured in the retaining structure 1248, the second portion 1224 of the feeder channel 1208 aligns with the first portion 1223 of the feeder channel 1208 to allow the second portion 1224 to be pivoted between open and closed positions relative to the first portion 1223.

Referring back to FIGS. 32-41, in the example shown, receptacles 1245 are provided on the first member 1241 of the handle 1204. The receptacles 1245 include retaining structures 1244 mounted to an interior surface of the first member 1241. The receptacles also define openings 1243 passing through the retaining structures 1244. In one embodiment, the openings 1243 also pass through an exterior of the first member 1241 of the handle 1204. The retaining structures 1244 define inside shoulders 1249.

Figure 21:
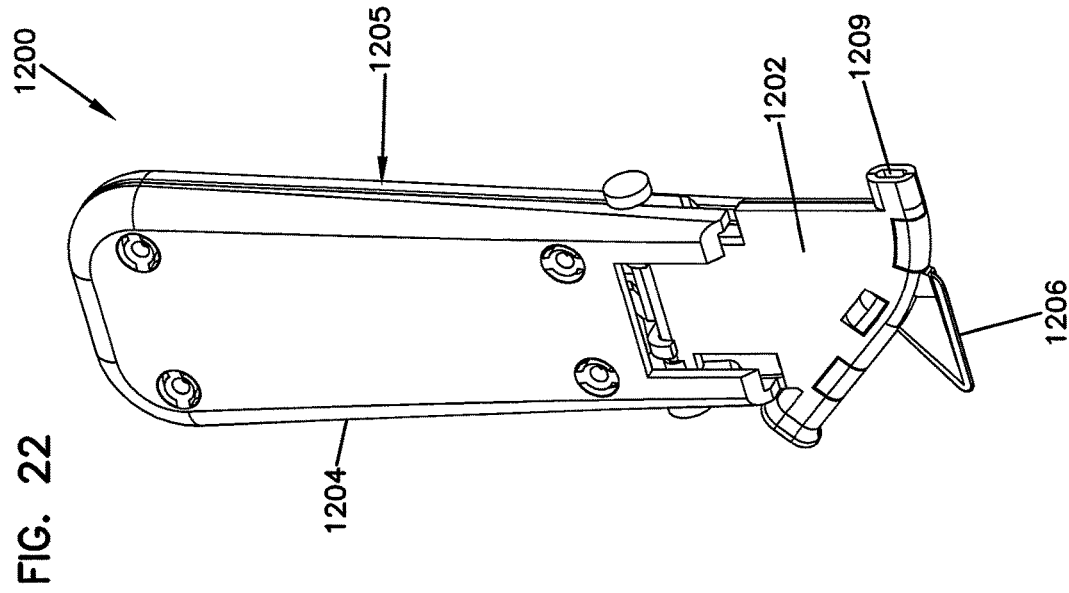
FIGS. 21 and 22 are second side perspective views of the example insertion tool of FIGS. 19 and 20 in accordance with the principles of the present disclosure.
Figure 22:
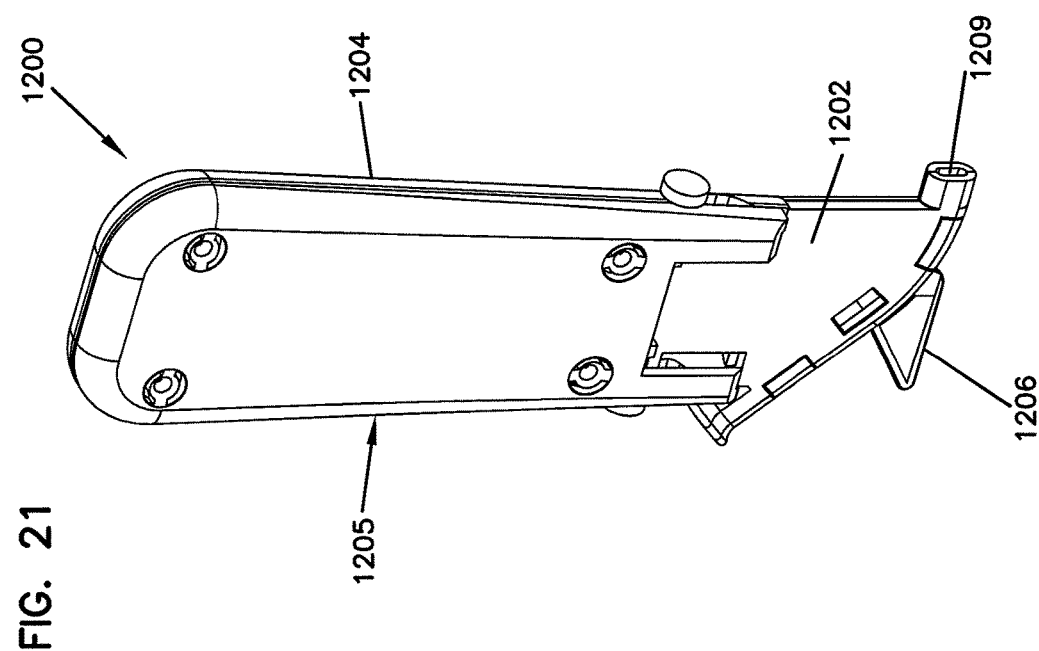

Referring to FIGS. 52-61, one example cover piece 1261 of the insertion tool 1200 includes the second member 1251 of the handle 1204. In the example shown, the second member 1251 defines a cutout 1252 between legs 1256. As shown in FIGS. 21 and 22, the cutout 1252 is sized and configured to accommodate the second section 1222 of the support structure 1202. The legs 1256 cooperate with the first member 1241 of the handle 1204 to enclose the hinge structure 1225 within the insertion tool 1200. The legs 1256 of the second member 1251 are accommodated by cutouts 1235 of the second section 1222.

In certain embodiments, the second member 1251 includes protrusions 1255 extending from an interior surface of the second member 1251. The protrusions 1255 include flanges 1253 extending outwardly from the second member 1251 and tips 1254 configured to interact with the inside shoulders 1249 within the retaining structures 1244 of the first handle member 1241. In the example shown, the protrusions 1255 include spaced flanges 1253 that can squeeze together when the tips 1254 are cammed into the retaining structures 1244.

Systems and methods consistent with the disclosure make possible the fabrication, installation, and use of extruded cable/fiber carriers for optical networks. The foregoing description of example features of the invention provides illustration and description, but is not intended to be exhaustive or to limit the invention to the precise form disclosed. Modifications and variations are possible in light of the above teachings or may be acquired from practice of the invention.

For example, implementations consistent with the principles of the invention can be implemented using other types of fabrication techniques, and assembly methods other than those illustrated in the figures and described in the specification without departing from the spirit of the invention. Furthermore, additional features can be added, or removed, depending on specific deployments, applications, and the needs of users and/or service providers.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The above specification, examples and data provide a complete description of the manufacture and use of the composition of the invention. Since many embodiments of the invention can be made without departing from the spirit and scope of the invention, the invention resides in the broad inventive aspects disclosed herein.

What is claimed is:

1. A fiber optic outlet box assembly, comprising:
   an enclosure defining a cavity therein;
   a spool rotatably situated in the cavity, the spool having first and second flanges spaced apart from one another with a core between inside surfaces of the first and second flanges and a cylindrical core extension extending from an outside surface of the first flange, the core and the core extension both being situated within the cavity and configured to have fiber optic cable wrapped thereabout, wherein the first and second flanges, the core and the core extension are all coaxial and are situated to rotate about a common rotation axis within the cavity relative to the enclosure;
   a plurality of fiber optic adapter mounts directly connected to the outside surface of the first flange;
   a fiber optic cable opening extending through the enclosure for paying out the fiber optic cable from the enclosure;
   a plurality of fiber optic adapter openings extending through the enclosure to provide access to the plurality of fiber optic adapter mounts;
   a plurality of fiber optic adapters received by the fiber optic adapter mounts, the fiber optic adaptors having first and second ports;
   a first fiber optic cable having first and second connectorized ends, the first connectorized end received by the first port of one of the fiber optic adaptors;
   a first portion of the first fiber optic cable extending from the first connectorized end and wrapped around the core extension;
   a second portion of the first fiber optic cable extending through an opening in the first flange and wrapped around the core with the second connectorized end extending through the fiber optic cable opening, such that the fiber optic cable may be selectively paid out through the fiber optic cable opening by rotating the spool within the enclosure to unwind the second portion of the first fiber optic cable from the core.

2. The fiber optic outlet box assembly of claim 1, wherein the spool is rotatable to a position where a selected one of the fiber optic adapters aligns with a selected one of the fiber optic adapter openings, the fiber optic outlet box further comprising:
   a second fiber optic cable having a connectorized end extending through the selected fiber optic adapter opening and received by the second port of the selected fiber optic adaptor.

3. The fiber optic outlet box assembly of claim 1, wherein the enclosure includes a first enclosure piece and a second enclosure piece mating with the first enclosure piece to form the cavity therebetween, the fiber optic outlet box assembly further comprising:
   a spindle extending from the first enclosure piece with the spool rotatably received thereon.

4. The fiber optic outlet box assembly of claim 3, wherein the first enclosure piece defines the fiber optic cable opening and an access slot extending from an edge of the first enclosure piece to the fiber optic cable opening, the access slot allowing a fiber optic cable to be laterally inserted into the cable opening.

5. The fiber optic outlet box assembly of claim 1, wherein the spool includes a first spool piece and a second spool piece, and wherein the core extends from the inside surface of the first spool piece and is received by the inside surface of the second spool piece by a snap-fit connection.

6. The fiber optic outlet box assembly of claim 1, wherein the enclosure is generally rectangular, and wherein the plurality of fiber optic adapter openings include fiber optic adapter openings in two opposing sides of the enclosure.

7. The fiber optic outlet box assembly of claim 6, wherein the spool is rotatable to a position where selected ones of the fiber optic adapters align with selected ones of the fiber optic adapter openings.

8. The fiber optic outlet box assembly of claim 6, wherein the plurality of fiber optic adapter openings include fiber optic adapter openings in four sides of the enclosure.

9. The fiber optic outlet box assembly of claim 1, wherein the enclosure is generally symmetrically situated about the spool.

10. The fiber optic outlet box assembly of claim 1, further comprising a plurality of the fiber optic cable openings.

11. The fiber optic outlet box assembly of claim 10, wherein the plurality of the fiber optic cable openings extend through opposing sides of the enclosure.

12. The fiber optic outlet box assembly of claim 1, wherein the fiber optic cable opening extends through a back surface of the enclosure.

13. A method of installing a fiber optic cable, comprising:
providing an enclosure having a spool rotatably situated therein, the spool including a core between inside surfaces of first and second flanges and a cylindrical core extension extending from an outside surface of the first flange such that the first and second flanges, the core and the core extension are all positioned inside the cavity and are coaxial and are rotatable about a common rotation axis, the outside surface of the first flange having a plurality of fiber optic adapters directly mounted thereon, the enclosure defining a fiber optic cable opening for paying out fiber optic cable from the enclosure;
mounting a first connectorized end of a first fiber optic cable to a first port of a selected one of the plurality of fiber optic adaptors;
wrapping a first portion of the first fiber optic cable extending from the first connectorized end around the core extension;
passing the first fiber optic cable through an opening in the first flange;
wrapping a second portion of the first fiber optic cable around the core such that the first and second portions of the first fiber optic cable are within the cavity;
extending the second connectorized end of the fiber optic cable through the fiber optic cable opening; and
rotating the spool to unwind the second portion of the first fiber optic cable from the core to pay out the fiber optic cable through the fiber optic cable opening.

14. The method of claim 13, further comprising mounting the enclosure to a wall.

15. The method of claim 13, wherein the enclosure includes a plurality of fiber optic adapter openings, the method further comprising:
rotating the spool such that a selected one of the fiber optic adapter openings aligns with a selected one of the fiber optic adapters;
extending a connectorized end of a second fiber optic cable through the selected one of the fiber optic adapter openings; and
mounting the connectorized and of the second fiber optic cable to a second port of the selected one of the fiber optic adaptors.

16. The method of claim 13, further comprising pulling the second connectorized end of the first fiber optic cable to rotate the spool.

17. The method of claim 13, further comprising:
plugging the second connectorized end of the first fiber optic cable into a fiber optic adapter; and
moving the enclosure to rotate the spool.

18. The method of claim 13, wherein the enclosure includes a first enclosure piece and a second enclosure piece, wherein the first enclosure piece defines the fiber optic cable opening and an access slot extending from an edge of the first enclosure piece to the fiber optic cable opening, the method further comprising:
laterally inserting the first fiber optic cable through the access slot into the fiber optic cable opening;
snap fitting the first enclosure piece to the second enclosure piece.

* * * * *